(12) United States Patent
Nakayama et al.

(10) Patent No.: US 9,203,477 B2
(45) Date of Patent: Dec. 1, 2015

(54) CONTACTLESS COMMUNICATION SYSTEM AND DIPOLE ANTENNA

(71) Applicant: Panasonic Corporation, Osaka (JP)

(72) Inventors: Takeshi Nakayama, Hyogo (JP); Hiroshi Suenaga, Osaka (JP); Tsutomu Sakata, Osaka (JP)

(73) Assignee: Panasonic Intellectual Property Management Co., Ltd., Osaka (JP)

( * ) Notice: Subject to any disclaimer, the term of this patent is extended or adjusted under 35 U.S.C. 154(b) by 167 days.

(21) Appl. No.: 14/001,913

(22) PCT Filed: Nov. 12, 2012

(86) PCT No.: PCT/JP2012/007226
§ 371 (c)(1),
(2) Date: Aug. 28, 2013

(87) PCT Pub. No.: WO2013/069307
PCT Pub. Date: May 16, 2013

(65) Prior Publication Data
US 2014/0056368 A1    Feb. 27, 2014

(30) Foreign Application Priority Data

Nov. 11, 2011   (JP) ................................. 2011-247351
Sep. 14, 2012   (WO) .................. PCT/JP2012/005867

(51) Int. Cl.
*H04B 5/00*   (2006.01)
*H01Q 21/28*  (2006.01)
(Continued)

(52) U.S. Cl.
CPC ............... *H04B 5/0081* (2013.01); *H01Q 1/38* (2013.01); *H01Q 9/16* (2013.01); *H01Q 9/285* (2013.01); *H01Q 13/085* (2013.01); *H01Q 21/28* (2013.01); *H01Q 23/00* (2013.01)

(58) Field of Classification Search
CPC ..... H04B 5/005; H04B 1/61637; H04B 1/719
USPC .......................... 455/41.2; 343/793; 375/256
See application file for complete search history.

(56) References Cited

U.S. PATENT DOCUMENTS

2009/0143009 A1    6/2009  Sasaki
2009/0273418 A1   11/2009  Shimizu et al.

FOREIGN PATENT DOCUMENTS

JP   2004-102651   *  4/2004
JP   2005-079783   *  3/2005
(Continued)

OTHER PUBLICATIONS

M. Nitta, et al., "Interference of Digital Noise with Integrated Dipole Antenna for Inter-chip Signal Transmission in ULSI", IEEE Antennas and Propagation Society International Symposium, Jul. 3, 2005, vol. 3B, pp. 264-267.*

(Continued)

*Primary Examiner* — Nay A Maung
*Assistant Examiner* — Angelica M Perez
(74) *Attorney, Agent, or Firm* — Wenderoth, Lind & Ponack, L.L.P.

(57) ABSTRACT

Provided is a contactless communication system in which each device performing communication in the system includes a dipole antenna having a length which is less than half of wavelength of a clock frequency of digital baseband signals which are communicated. The dipole antennas are disposed in opposing positions to one another. The contactless communication system performs short distance contactless communication of the digital baseband signals using a frequency band which does not include a resonant frequency of the dipole antennas.

25 Claims, 21 Drawing Sheets

(51) Int. Cl.
*H01Q 23/00* (2006.01)
*H01Q 9/28* (2006.01)
*H01Q 13/08* (2006.01)
*H01Q 9/16* (2006.01)
*H01Q 1/38* (2006.01)

(56) References Cited

FOREIGN PATENT DOCUMENTS

| | | |
|---|---|---|
| JP | 2005-79783 | 3/2005 |
| JP | 2006-324766 | 11/2006 |
| JP | 2009-135632 | 6/2009 |
| JP | 2009-268022 | 11/2009 |

OTHER PUBLICATIONS

Anatoliy O. Borissenko, et al., "Dispersive Properties of Terminal-Loaded Dipole Antennas in UWB Link", IEEE Antennas and Propagation Society International Symposium 2006, Jul. 9, 2006, pp. 4645-4648.*

International Search Report issued Dec. 18, 2012 in corresponding International Application No. PCT/JP2012/007226.

Anatoliy O. Boryssenko, et al., "Dispersive Properties of Terminal-Loaded Dipole Antennas in UWB Link", IEEE Antennas and Propagation Society International Symposium 2006, Jul. 9, 2006, pp. 4645-4648.

Yingsong Li, et al., "A CPW-fed Loop Antenna with Multi-notch Band for UWB Applications", Cross Strait Quad-Regional Radio Science and Wireless Technology Conference(CSQRWC), Jul. 26, 2011, vol. 1, pp. 359-362.

* cited by examiner

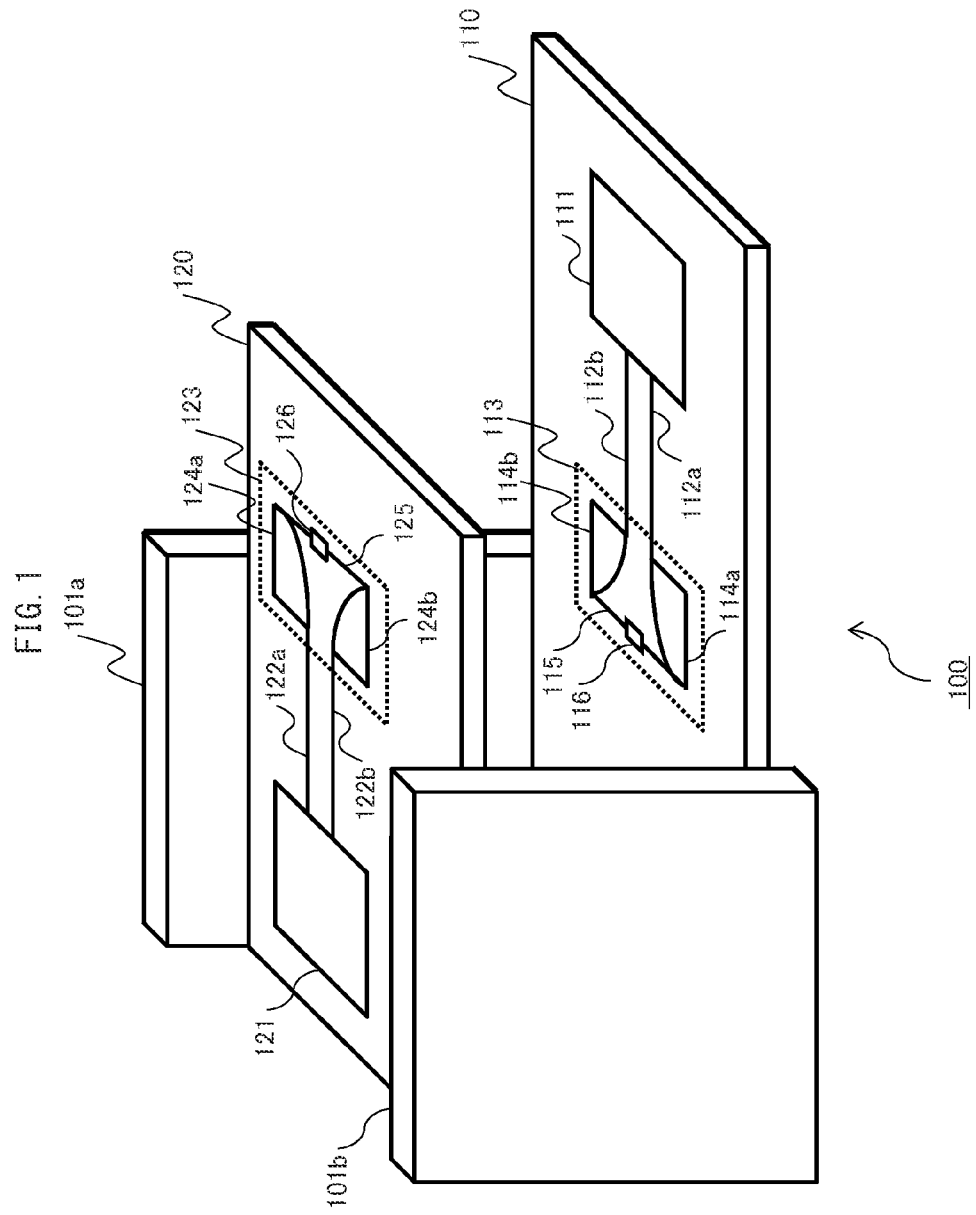

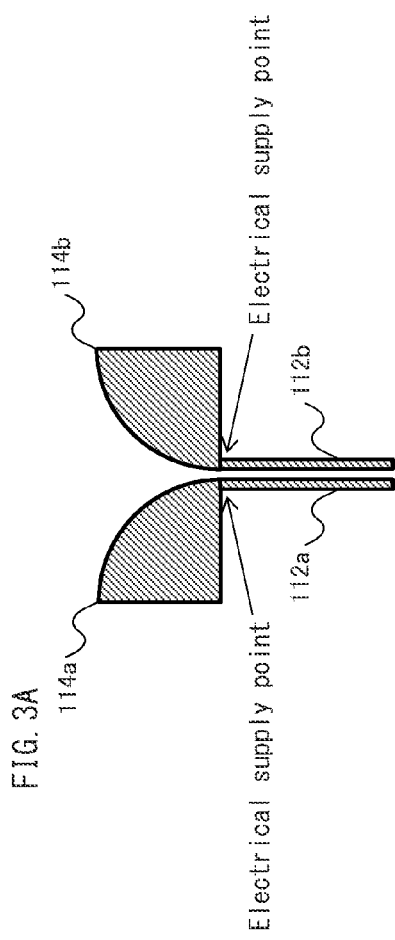
FIG. 3A
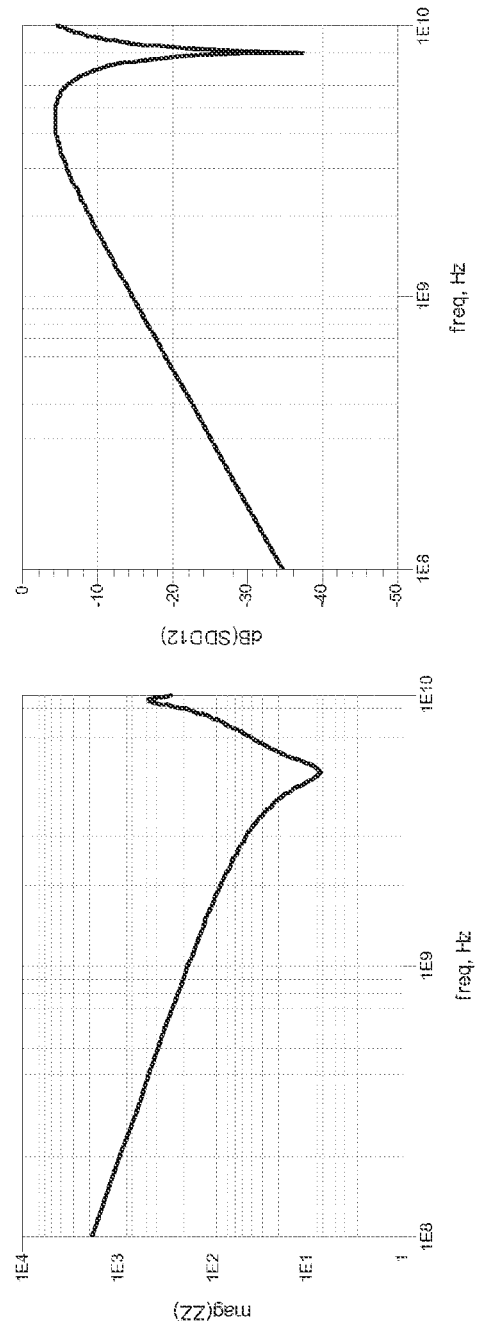
FIG. 3B
FIG. 3C

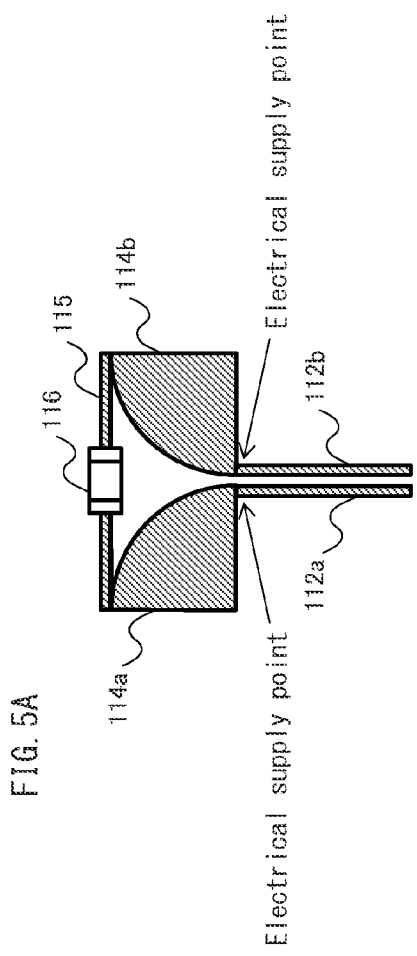
FIG. 5A
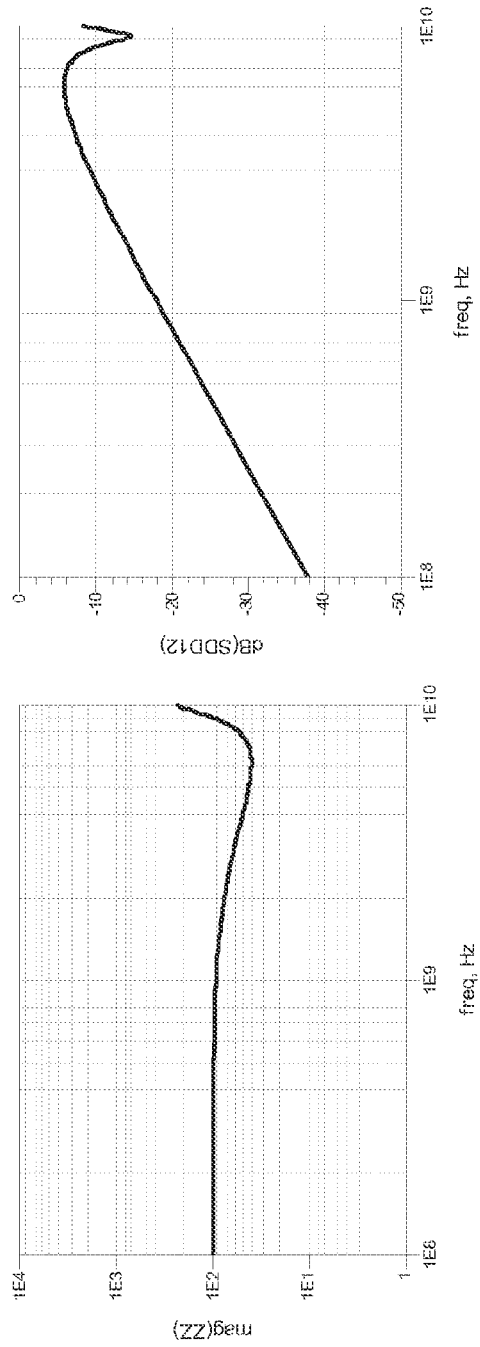
FIG. 5B
FIG. 5C

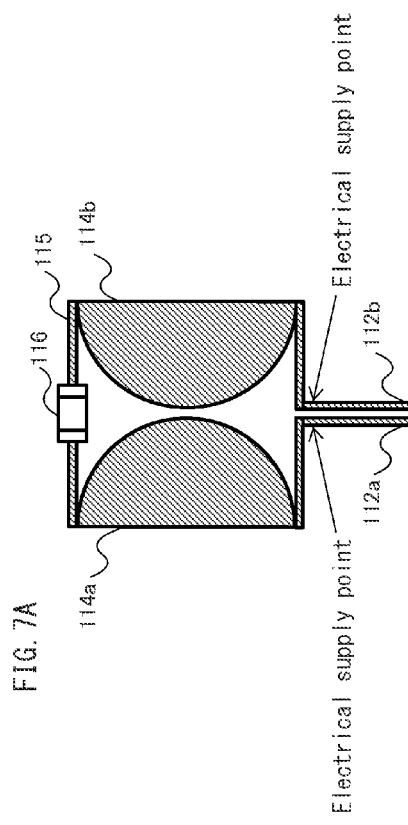
FIG. 7A
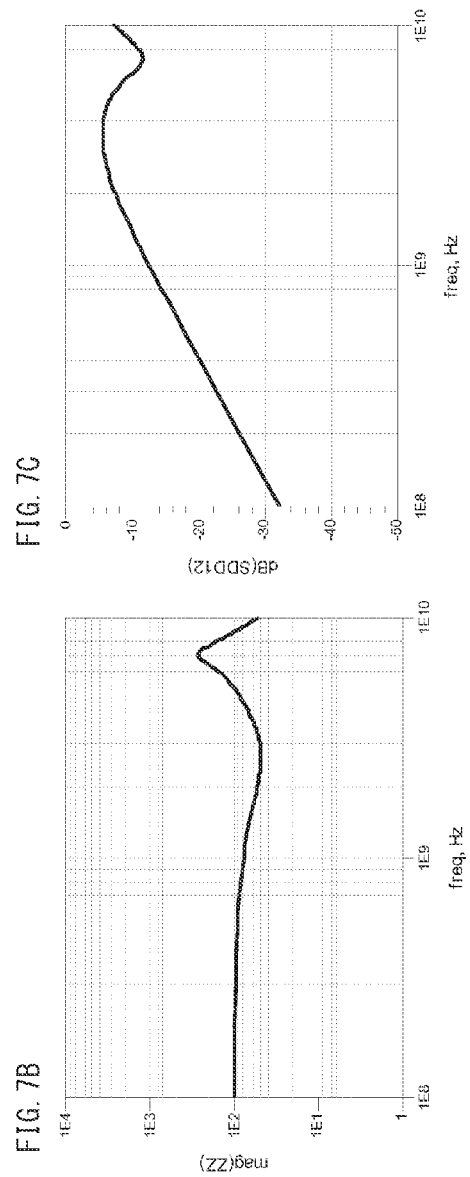
FIG. 7B
FIG. 7C

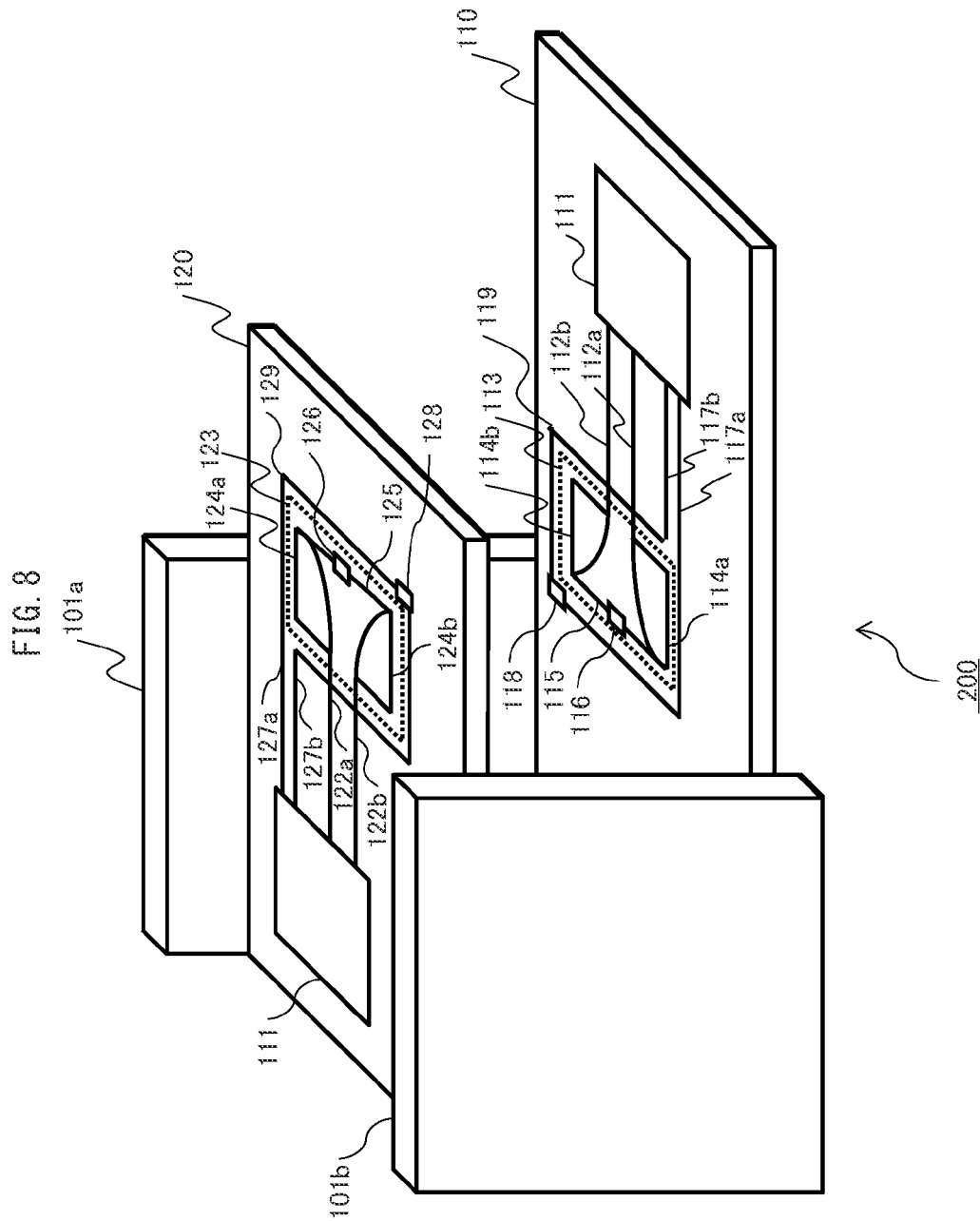

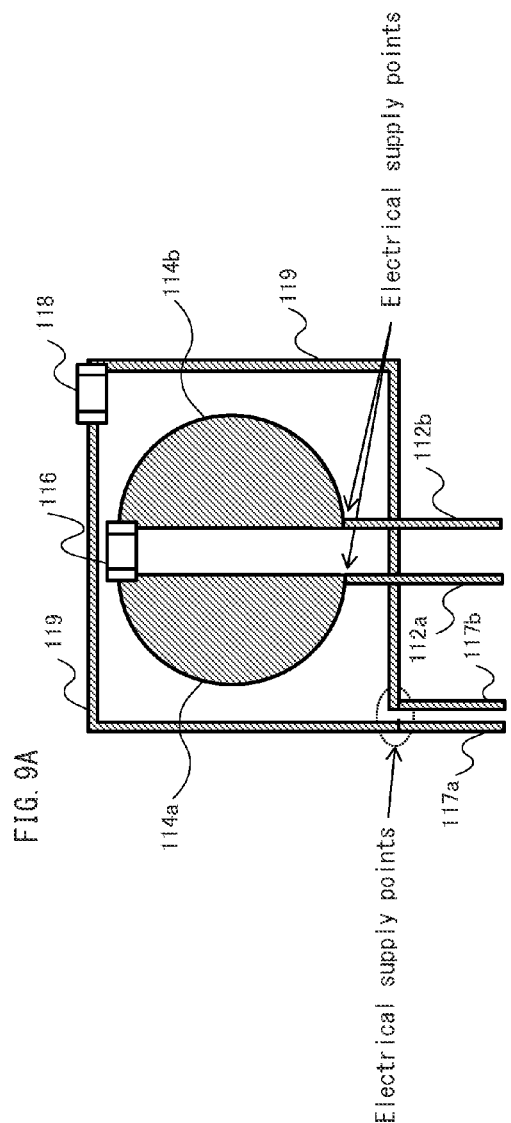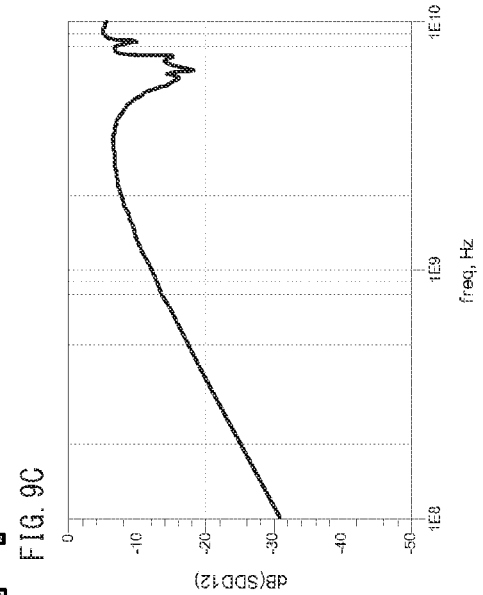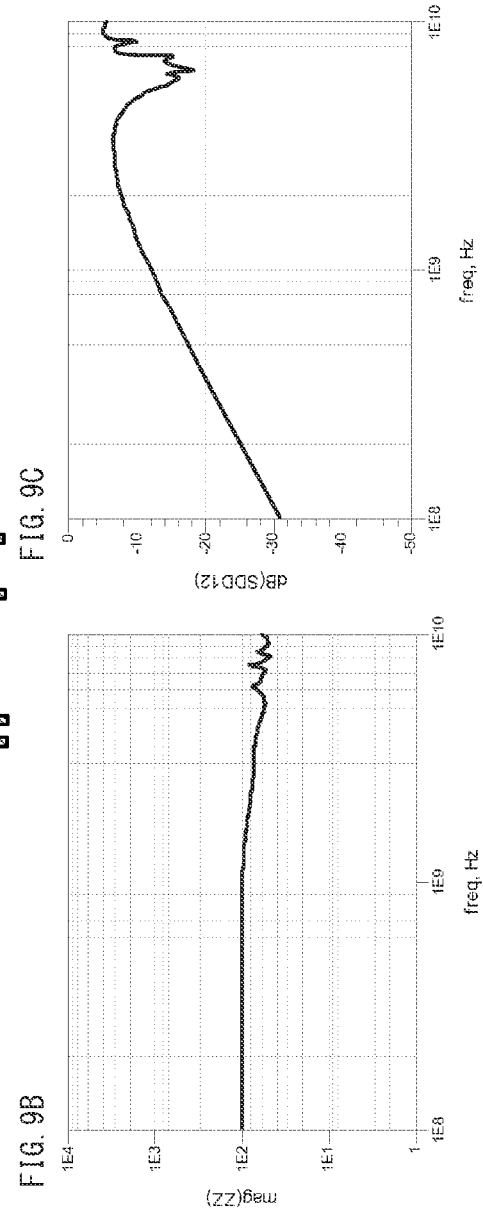

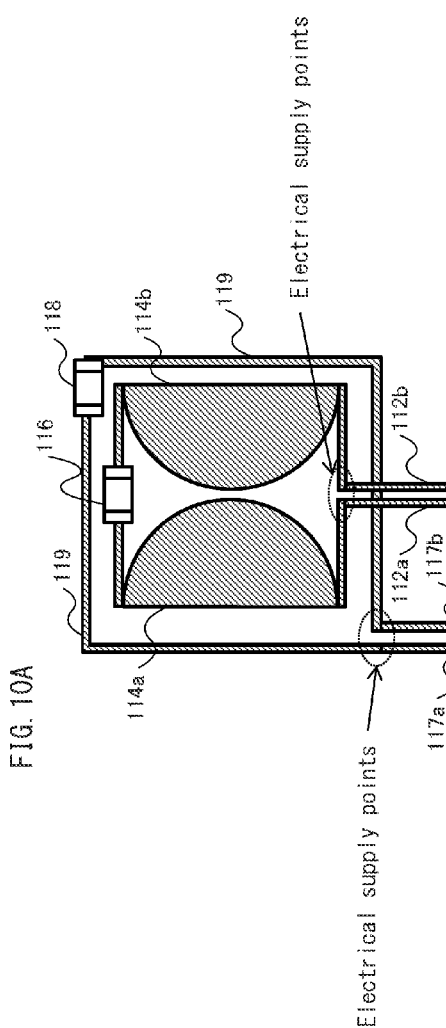
FIG. 10A
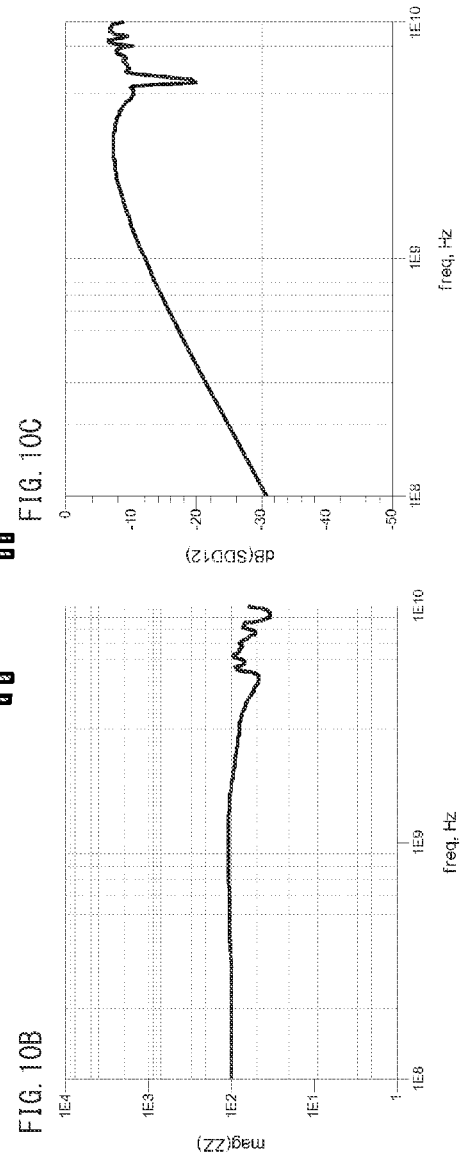
FIG. 10B
FIG. 10C

CONTACTLESS COMMUNICATION SYSTEM AND DIPOLE ANTENNA

TECHNICAL FIELD

The present invention relates to a contactless communication system that performs contactless communication using near-field coupling.

BACKGROUND ART

In recent years, contactless communication using near-field coupling has been proposed for inter-layer signal transmission in a multi-layer substrate using an IC (Integrated Circuit) bare chip, PCB (Printed Circuit Board), or the like. Typically, a TSV (Through Silicon Via) or the like is used for inter-layer communication. However, in order to increase the number of inter-layer transmission pathways, the number of TSVs must also be increased, thus hindering miniaturization of a device in which the multi-layer substrate is provided. On the other hand, by performing contactless communication, installation space is not required for TSVs and the degree of design freedom is increased, thus allowing reduction in surface area of the multi-layer substrate.

Furthermore, in contactless communication digital baseband signals can be transmitted and received without modification, therefore contactless communication has an advantage that mounting of circuits for performing modulation and demodulation is not necessary.

CITATION LIST

Patent Literature

[Patent Literature 1] Japanese Patent Application Publication No. 2009-268022
[Patent Literature 2] Japanese Patent Application Publication No. 2006-324766

SUMMARY OF INVENTION

Technical Problem

Digital baseband signals differ in terms of frequency depending on chips, cores or the like which are being used. Due to the differing frequencies, an antenna used in a contactless communication system is required to be resilient to use over a relatively wide frequency band.

The present invention was made in view of the above problem, and aims to provide a contactless communication system which can perform contactless communication over a wide frequency band.

Solution to Problem

In order to solve the above problem, a contactless communication system relating to the present invention comprises a first device and a second device, and performs contactless communication of digital baseband signals between the first device and the second device using near-field coupling, wherein the first device includes: a first antenna operable to transmit a digital baseband signal; and a first communication unit operable to supply the digital baseband signal to the first antenna, the second device includes a second antenna operable to receive the digital baseband signal, and the first communication unit supplies the digital baseband signal to the first antenna without using a resonant frequency of the first antenna.

Advantageous Effects of Invention

Through the above configuration, digital baseband signals can be transmitted over a wide frequency band, which is a band of frequencies other than the resonant frequency which is used in standard communications.

BRIEF DESCRIPTION OF DRAWINGS

FIG. 1 is an overview diagram illustrating configuration of a contactless communication system relating to a first embodiment.

FIG. 3A illustrates shape of a dipole antenna, FIG. 3B illustrates an antenna characteristic of the dipole antenna, and FIG. 3C illustrates a differential transmission characteristic of the dipole antenna.

FIG. 5A illustrates shape of a dipole antenna, FIG. 5B illustrates an antenna characteristic of the dipole antenna, and FIG. 5C illustrates a differential transmission characteristic of the dipole antenna.

FIG. 7A illustrates shape of a dipole antenna, FIG. 7B illustrates an antenna characteristic of the dipole antenna, and FIG. 7C illustrates a differential transmission characteristic of the dipole antenna.

FIG. 8 is an overview diagram illustrating configuration of a contactless communication system relating to a second embodiment.

FIG. 9A illustrates shape of an antenna relating to the second embodiment, FIG. 9B illustrates an antenna characteristic of a loop antenna, and FIG. 9C illustrates a differential transmission characteristic of the loop antenna.

FIG. 10A illustrates shape of an antenna relating to the second embodiment, FIG. 10B illustrates an antenna characteristic of a loop antenna, and FIG. 10C illustrates a differential transmission characteristic of the loop antenna.

DESCRIPTION OF EMBODIMENTS

Knowledge Acquired by the Inventors

As described above, frequencies of digital baseband signals differ depending on the chip or core used. Due to the differing frequencies, an antenna used in a contactless communication system is required to be resilient to use over a relatively wide frequency band.

Figure 18:
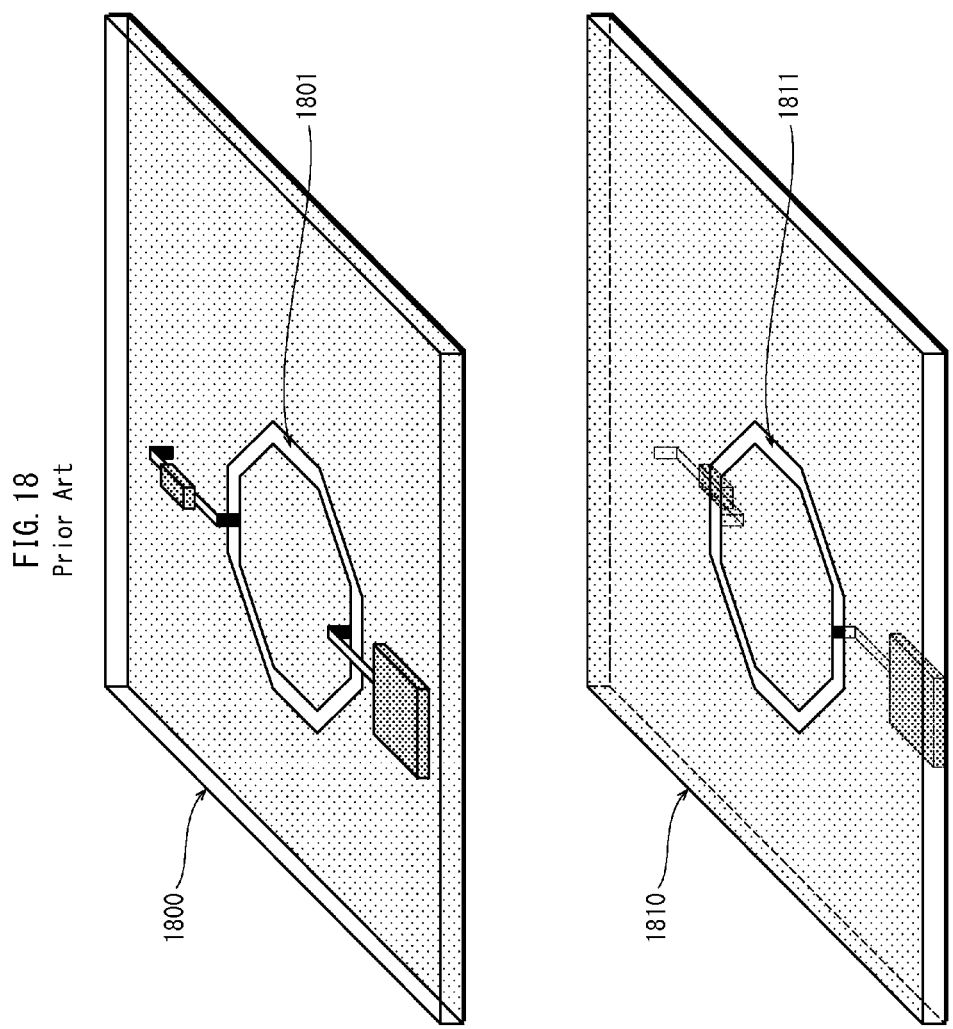
FIG. 18 illustrates an example of configuration in conventional contactless communication.

Patent Literature 1 discloses a contactless communication system for transmitting and receiving digital baseband signals. Patent Literature 1 proposes an art wherein slot antennas are each formed on a printed substrate, and by disposing the slot antennas in opposing positions close to one another, contactless communication can be performed. As illustrated in FIG. 18, in the case of Patent Literature 1 slot antennas 1801 and 1811 are configured by providing an opening of 6 mm in diameter in a transmission substrate 1800 and a reception substrate 1810 respectively. The transmission substrate 1800 and the reception substrate 1810 each have dimensions of 40 mm by 50 mm. By disposing the slot antennas 1801 and 1811 so that antenna surfaces thereof were in opposing positions to one another separated by a distance of 2 mm, transfer rate of 5 Gbps from the transmission substrate 1800 to the reception substrate 1810 was achieved. During the above, the slot antennas in Patent Literature 1 were not used as resonance type slot antennas such as used in convention long-distance wireless communication, where slots are provided separated by a half wavelength of a frequency used in communication. Instead, the slot antennas were performing communications using coupling of a near electromagnetic field. Coupling of a near electromagnetic field is referred to as near-field coupling, and the same terminology is used in the present application. In some cases, near-field coupling may alternatively be referred to as near electromagnetic field coupling or electromagnetic field coupling.

Unfortunately, in the case of Patent Literature 1, use of slot antennas which are each 6 mm in diameter is required in order to perform communication of digital baseband signals at the rate of 5 Gbps. Furthermore, in a configuration in which slot antennas are used provision of peripheral grounding is also essential, thus presenting a problem that an antenna mounting surface of 40 mm by 50 mm is required for each of the slot antennas in order to form a single communication line. Therefore, the configuration in Patent Literature 1 is not well suited to application in a miniaturized device.

The contactless communication system and antenna relating to the present invention solve the above problem by providing a configuration in which communications can be performed over a wide frequency band and on a smaller scale than the communication system recited in Patent Literature 1.

Generally in wireless communications, an antenna is configured to have favorable communication properties at a specific frequency, and the antenna is used to perform communications at the specific frequency.

Figure 17:
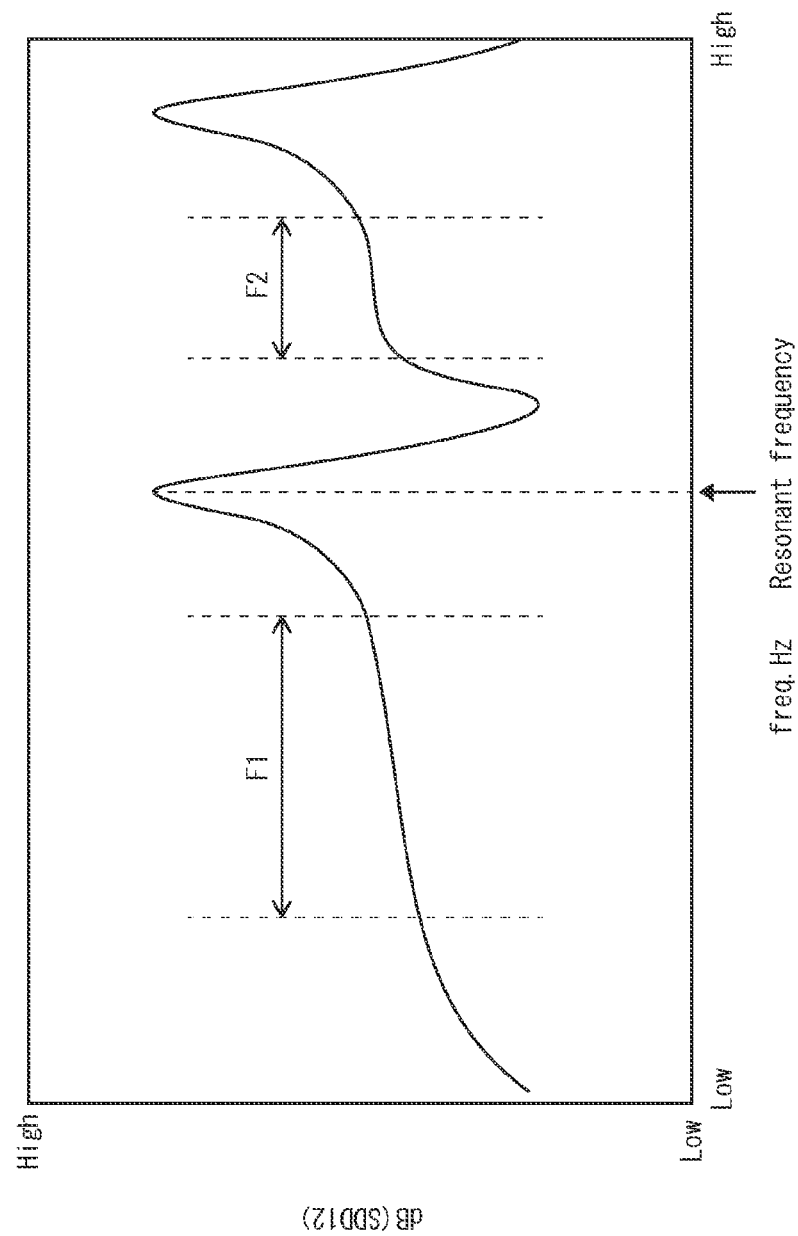
FIG. 17 illustrates an example of an antenna characteristic.

FIG. 17 illustrates a typical antenna characteristic, in which the specific frequency is a resonant frequency. As illustrated in FIG. 17, a differential transmission characteristic of an antenna is normally high at a resonant frequency of the antenna. Unfortunately, although the resonant frequency is suited for favorable communications, a frequency band corresponding to the resonant frequency is not wide, as illustrated in FIG. 17.

On the other hand, in the contactless communication system relating to the present invention, a digital baseband signal is applied to an antenna. For example, in order to transmit a digital baseband signal of completely random data, an extremely wide frequency band for communications is required from a frequency of a DC (Direct Current) component (0 Hz) to five times a frequency of an operation clock. Therefore, as explained above the contactless communication system is required to be capable of performing communications over a wide frequency band.

In regards to achieving communications over a wide frequency band, the inventors of the present invention discovered that communications are sufficiently resilient (transfer of information is possible) in sections of a differential transmission characteristic of an antenna in which the differential transmission characteristic is stable (only exhibiting a small amount of variation, in other words fluctuation, or being level), so long as the differential transmission characteristic is above a certain value. For example, sections F1 and F2 illustrated in FIG. 17 are sections such as described above, which are not used in standard communications. Furthermore, the inventors discovered that particularly for sections of the differential transmission characteristic exhibiting relatively small variation (increase or decrease), communications can be performed using any frequency in a frequency band corresponding to the section.

In particular, for the section F1 of the differential transmission characteristic which is approximately level, the inventors discovered that communications are sufficiently resilient when as a result of signal adjustment using amplification, pre-emphasis and the like on a transmitting side, and using amplification, equalizing and the like on a receiving side, an attenuation amount of the differential transmission characteristic is at least approximately −10 dB. The attenuation amount of −10 dB is for wireless transmission relative to ideal wired connection (attenuation amount of 0). For example, if the differential transmission characteristic of an antenna is −40 dB at a certain frequency, communications are possible at the certain frequency if enhancement of +30 dB is achieved through signal adjustment.

The following explains an embodiment of the contactless communication system relating to the present invention and antennas used therein.

First Embodiment

Figure 19:
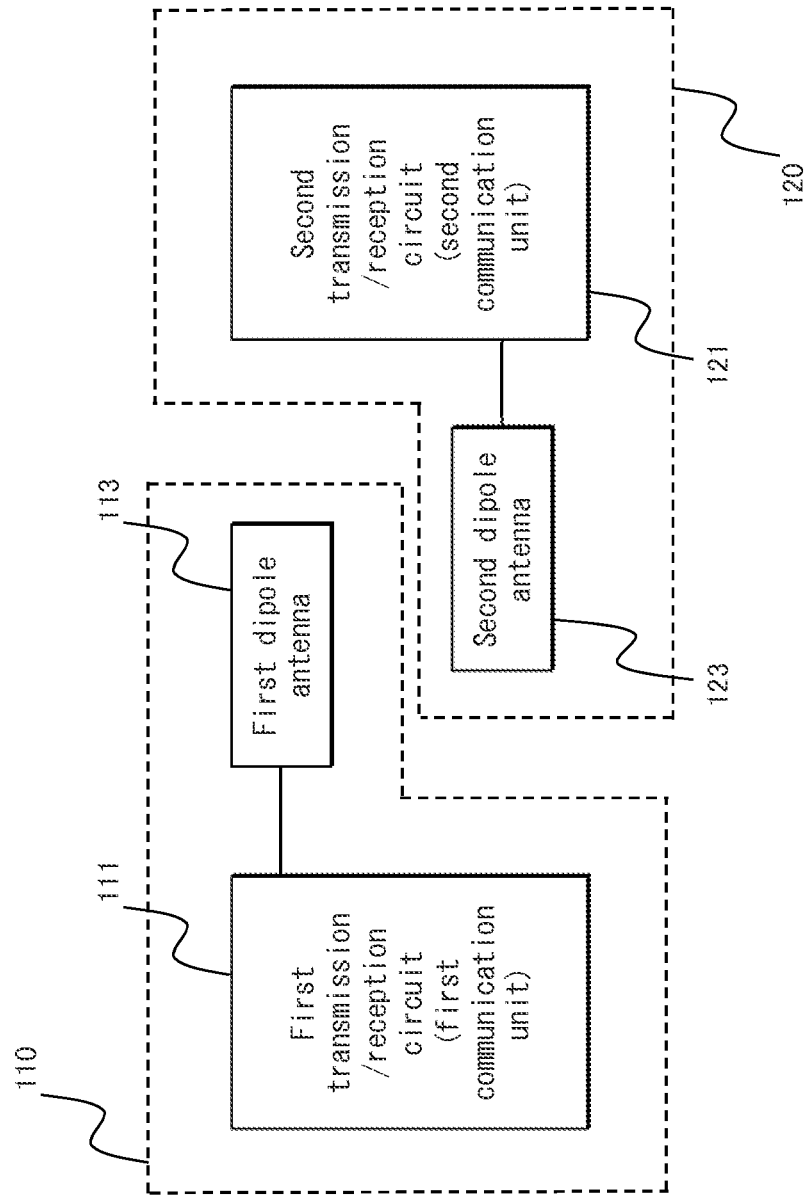
FIG. 19 is a functional block diagram illustrating an example of functional configuration of the contactless communication system relating to the first embodiment.
Figure 20:
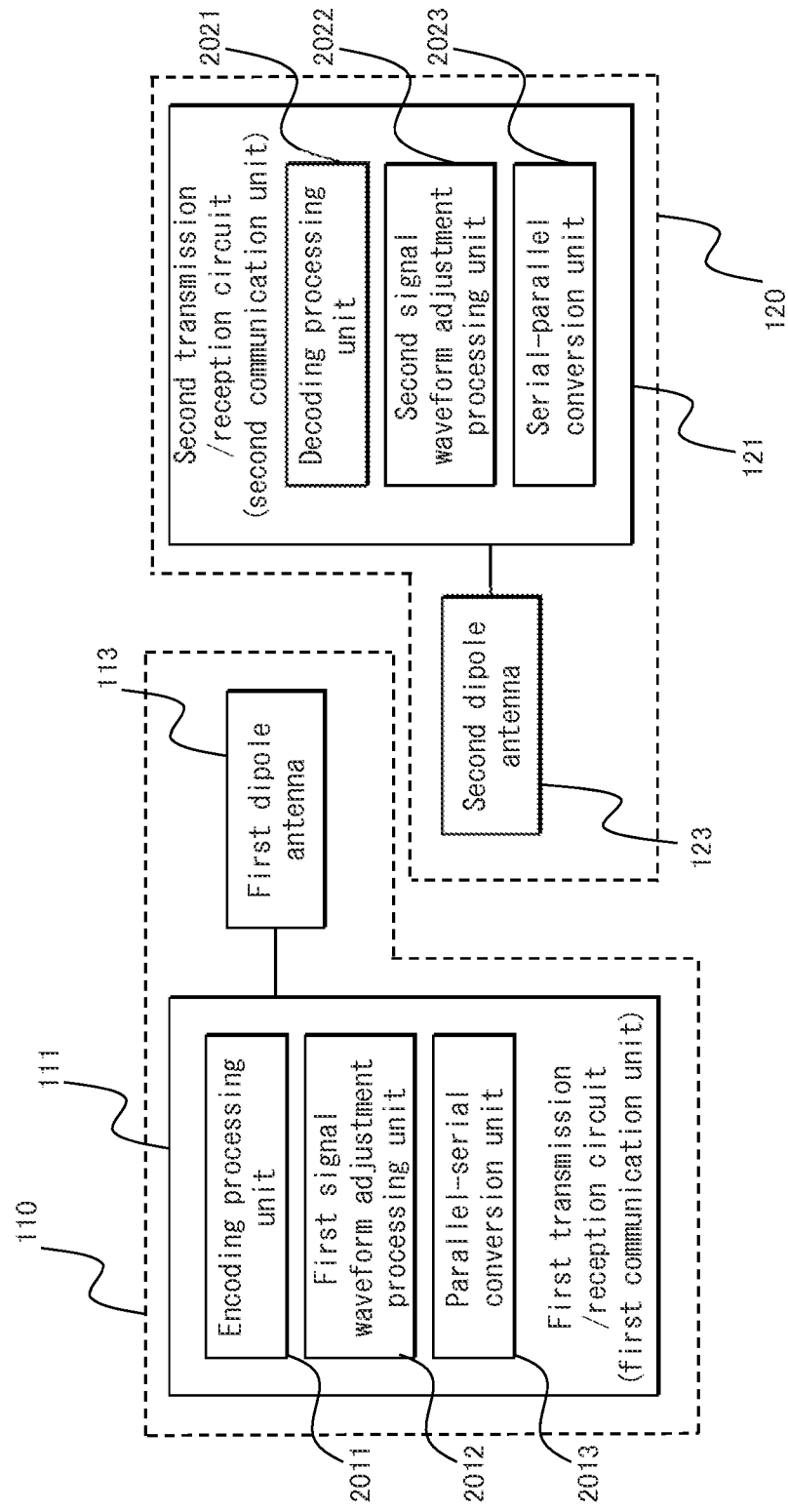
FIG. 20 is a functional block diagram illustrating an example of functional configuration of the contactless communication system relating to the first embodiment.
Figure 21:
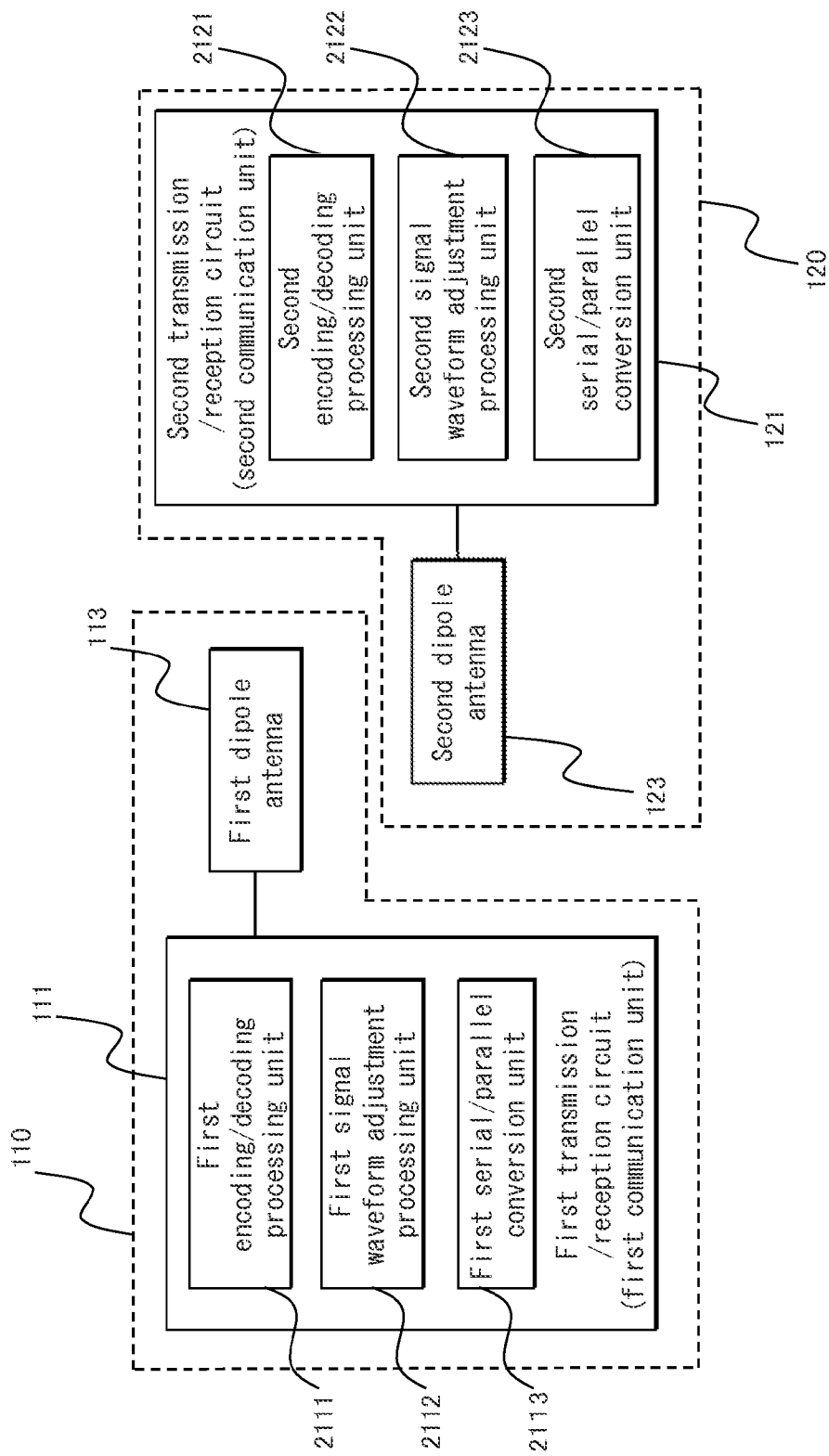
FIG. 21 is a functional block diagram illustrating an example of functional configuration of the contactless communication system relating to the first embodiment.

FIG. 1 is an overview diagram illustrating configuration of a contactless communication system 100 relating to a first embodiment. FIGS. 19, 20 and 21 are functional block diagrams, each illustrating an example of functional configuration of the contactless communication system relating to the first embodiment. Configuration elements in FIGS. 19, 20 and 21 which are the same as configuration elements in FIG. 1 are labeled using the same reference signs and detailed explanation thereof is omitted.

As illustrated in FIG. 1, the contactless communication system 100 includes a first contactless communication device 110, a second contactless communication device 120, and device holders 101a and 101b. The first contactless communication device 110 and the second contactless communication device 120 are both held by the device holders 101a and 101b.

As illustrated in FIG. 1, the first contactless communication device 110 includes a first transmission/reception circuit 111, differential wires 112a and 112b, and a first dipole antenna 113.

As illustrated in FIG. 21, the first transmission/reception circuit 111 includes a first encoding/decoding processing unit 2111, a first signal waveform adjustment processing unit 2112, and a first serial/parallel conversion unit 2113. The first encoding/decoding processing unit 2111 performs encoding processing on a signal to be transmitted and performs decoding processing on a signal which is received. The first encoding/decoding processing unit 2111 may for example perform 8b10b encoding processing on a signal to be transmitted and perform 8b10b decoding processing on a signal which is received. 8b10b referred to above may alternatively be written as 8b/10b or 8B10B, and the same applies to other coding schemes recited herein which are expressed in the same format.

The first encoding/decoding processing unit 2111 sends data after encoding to the first serial/parallel conversion unit 2113. The first encoding/decoding processing unit 2111 sends data after decoding to an upper level (such as a CPU) of the first contactless communication device 110.

The first signal waveform adjustment processing unit 2112 performs adjustment of waveform of a signal to be transmitted, on which encoding processing and parallel-serial conversion have been performed, and also of a signal which is received. For example the first signal waveform adjustment processing unit 2112 may be a circuit capable of using AC (alternating current) coupling, on which an amplifier circuit, pre-emphasis circuit, de-emphasis circuit, equalizer circuit and the like are mounted. Herein, adjusting waveform of a signal refers to processing for correcting distortion of the signal. As long as at least one out of the amplifier circuit, the pre-emphasis circuit, the de-emphasis circuit and the equalizer circuit is included in the first signal waveform adjustment processing unit 2112, inclusion of all of the above elements is not essential. Once the first signal waveform adjustment processing unit 2112 has adjusted waveform of the signal to be transmitted, the first signal waveform adjustment processing unit 2112 sends the signal to the first dipole antenna 113. Once the first signal waveform adjustment processing unit 2112 has adjusted waveform of the signal which is received, the first signal waveform adjustment processing unit 2112 sends the signal to the first serial/parallel conversion unit 2113.

With regards to a digital baseband signal which has been encoded by the first encoding/decoding processing unit 2111, the first serial/parallel conversion unit 2113 performs parallel-serial conversion, and sends serial data resulting therefrom to the first signal waveform adjustment processing unit 2112. Also, with regards to a digital baseband signal which is received, once waveform adjustment has been performed on the digital baseband signal by the first signal waveform adjustment processing unit 2112, the first serial/parallel conversion unit 2113 performs serial-parallel conversion on the digital baseband signal, and sends parallel data resulting therefrom to the first encoding/decoding processing unit 2111.

The first transmission/reception circuit 111 has a function of transmitting along the differential wires 112a and 112b, a digital baseband signal addressed to the second transmission/reception circuit 121, and a function of receiving from the differential wires 112a and 112b, a digital baseband signal transmitted from the second transmission/reception circuit 121. The first transmission/reception circuit 111 transmits and receives digital baseband signals of a clock frequency different to a resonant frequency of dipole antennas used in communications with the second transmission/reception circuit 121. In other words, the first transmission/reception circuit 111 transmits and receives digital baseband signals without using a resonant frequency of the first dipole antenna 113. Digital baseband signals which are positive-negative opposites of one another respectively flow through the differential wire 112a and the differential wire 112b. Herein, the above also applies to any differential wires forming a differential pair.

Through performing 8b10b encoding, flow of the DC component can be restricted.

Alternatively, the first transmission/reception circuit 111 may include a current latch mechanism (not illustrated). A configuration in which the DC component is not obtained can be achieved through the current latch mechanism, by latching changing current at a change point of a voltage point of data.

A first transmission/reception circuit (first communication unit) 111 illustrated in FIG. 20 includes an encoding processing unit 2011, a first signal waveform adjustment processing unit 2012 and a parallel-serial conversion unit 2013. FIG. 20 is a functional block diagram illustrating functions required when transmitting a signal from the first transmission/reception circuit (first communication unit) 111 to the second transmission/reception circuit (second communication unit) 121. The encoding processing unit 2011, the first signal waveform adjustment processing unit 2012 and the parallel-serial conversion unit 2013 of the first transmission/reception circuit (first communication unit) 111 illustrated in FIG. 20, have functions required for signal transmission among the functions of the first encoding/decoding processing unit 2111, the first signal waveform adjustment processing unit 2112, and the first serial/parallel conversion unit 2113 illustrated in FIG. 21.

The 8b10b encoding has a function of ensuring that "0" or "1" is not transmitted for five or more consecutive bits. Through the above, a minimum frequency (where the encoded signal's 10-bit is equivalent to five cycles of a toggle frequency) of an encoded signal for transmission is ⅕ of a base frequency (where the encoded signal's 2-bit is equivalent to one cycle of the toggle frequency). Wireless transmission of low frequency components which are lower than the minimum frequency is not necessary. The same effect of making wireless transmission of the low frequency components unnecessary can be achieved by 2b4b encoding, 64b66b encoding, 128b130b encoding, CMI encoding, Manchester encoding or the like. Any of the types of encoding described above may be used as an alternative to the 8b10b encoding. Encoding schemes with a high redundancy such as 2b4b encoding and Manchester encoding have a characteristic of having high restriction effects on low frequency components. Conversely, encoding schemes with a low redundancy such as 128b130b encoding have a characteristic of having low restriction effects on low frequency components. Consequently, an encoding scheme should be selected in accordance with a frequency band usable by an antenna. For example, an encoding scheme with a low redundancy should preferably be selected for an antenna which is useable over a wide frequency band, and an encoding scheme with a high redundancy should preferably be selected for an antenna useable over a narrow frequency band.

Signal processing of amplifying, pre-emphasis, de-emphasis, equalizing or the like is used in either the transmission circuit or the reception circuit in order to amplify signal components which are deteriorated on the receiving side due to communication of the signal. Of course, so long as a transmitted waveform can be restored on the receiving side, any combination of the above processing may be used.

Also, for transmission and reception of a signal in which low frequency components do not occur, such as a clock waveform, encoding processing such as using the 8b10b encoding is not required.

The differential wires 112a and 112b have a function of transferring a digital baseband signal sent from the first transmission/reception circuit 111 to the first dipole antenna 113. The differential wires 112a and 112b also have a function of transferring a digital baseband signal sent from the first dipole antenna 113 to the first transmission/reception circuit 111.

The first dipole antenna 113 performs transmission and reception of digital baseband signals with the second dipole antenna 123 using near-field coupling.

As illustrated in FIG. 1, the first dipole antenna 113 includes a first antenna element 114a, a second antenna element 114b, a wire 115 and a terminator 116, which is inserted into the wire 115.

The first antenna element 114a is a fan-shaped quarter circle conductive plate of radius 4 mm.

As illustrated in FIG. 1, a contact point with the differential wire 112a at one end of an arc-shaped edge of the first antenna element 114a is an electrical supply point for the first antenna element 114a.

The second antenna element 114b is a fan-shaped quarter circle conductive plate of radius 4 mm.

As illustrated in FIG. 1, a contact point with the differential wire 112b at one end of an arc-shaped edge of the second antenna element 114b is an electrical supply point for the second antenna element 114b.

The first antenna element 114a and the second antenna element 114b are each connected to the wire 115 at an opposite end of the arc-shaped edge thereof to the end at which the power supply point is located.

The terminator 116 is inserted into the wire 115.

The terminator 116 is a resistive element (resistor). Resistance of the terminator 116 differs depending on an antenna characteristic which is desired.

Although not illustrated in the drawings, the first contactless communication device 110 may include other elements (for example a memory or a circuit having another function).

The second contactless communication device 120 has the same configuration as the first contactless communication device 110.

Specifically, the second contactless communication device 120 includes the second transmission/reception circuit 121, differential wires 122a and 122b, and a second dipole antenna 123.

As illustrated in FIG. 1, the second contactless communication device 120 includes the second transmission/reception circuit 121, the differential wires 122a and 122b, and the second dipole antenna 123.

As illustrated in FIG. 21, the second transmission/reception circuit 121 includes a second encoding/decoding processing unit 2121, a second signal waveform adjustment processing unit 2122 and a second serial/parallel conversion unit 2123 in the same way as the first transmission/reception circuit 111. The second encoding/decoding processing unit 2121 performs encoding processing on a signal to be transmitted and performs decoding processing on a signal which is received. For example, the second encoding/decoding processing unit 2121 performs 8b10b encoding processing when transmitting a signal and 8b10b decoding processing when receiving a signal.

The second encoding/decoding processing unit 2121 sends data after encoding to the second serial/parallel conversion unit 2123. The second encoding/decoding processing unit 2121 sends data after decoding to an upper level (such as a CPU) of the second contactless communication device 120.

The second signal waveform adjustment processing unit 2122 performs adjustment of waveform of a signal to be transmitted, on which encoding processing and parallel-serial conversion have been performed, and also of a signal which is received. For example the second signal waveform adjustment processing unit 2122 may be a circuit capable of using AC coupling, on which an amplifier circuit, pre-emphasis circuit, de-emphasis circuit, equalizer circuit and the like are mounted. So long as at least one out of the amplifier circuit, the pre-emphasis circuit, the de-emphasis circuit and the equalizer circuit is included in the second signal waveform adjustment processing unit 2122, inclusion of all the above elements is not necessary. Once the second signal waveform adjustment processing unit 2122 has adjusted waveform of the signal to be transmitted, the second signal waveform adjustment processing unit 2122 sends the signal to the second dipole antenna 123. Once the second signal waveform adjustment processing unit 2122 has adjusted waveform of the signal which is received, the second signal waveform adjustment processing unit 2122 sends the signal to the second serial/parallel conversion unit 2113.

With regards to a digital baseband signal which has been encoded by the second encoding/decoding processing unit 2111, the second serial/parallel conversion unit 2123 performs parallel-serial conversion, and sends serial data resulting therefrom to the second signal waveform adjustment processing unit 2122. Also, with regards to a digital baseband signal on which waveform adjustment has been performed by the second signal waveform adjustment processing unit 2122 after reception of the digital baseband signal, the second serial/parallel conversion unit 2123 performs serial-parallel conversion on the digital baseband signal, and sends parallel data resulting therefrom to the second encoding/decoding processing unit 2121.

The second transmission/reception circuit 121 has a function of transmitting along the differential wires 122a and 122b, a digital baseband signal addressed to the first transmission/reception circuit 111, and a function of receiving from the differential wires 122a and 122b, a digital baseband signal transmitted from the first transmission/reception circuit 111. The second transmission/reception circuit 121 transmits and receives digital baseband signals of a clock frequency different to a resonant frequency of dipole antennas used in communications with the first transmission/reception circuit 111. In other words, the second transmission/reception circuit 121 transmits and receives digital baseband signals without using a resonant frequency of the second dipole antenna 123. Digital baseband signals which are positive/negative opposites of one another respectively flow through the differential wires 122a and the differential wire 122b. Herein, the above also applies to any differential wires forming a differential pair.

Through performing 8b10b encoding, flow of a DC component can be restricted.

Alternatively, the second transmission/reception circuit 121 may include a current latch mechanism (not illustrated). A configuration in which the DC component is not obtained can be achieved through the current latch mechanism, by latching changing current at a change point of a voltage point of data.

A second transmission/reception circuit (second communication unit) 121 illustrated in FIG. 20 includes an encoding processing unit 2021, a second signal waveform adjustment processing unit 2022 and a parallel-serial conversion unit 2023. The encoding processing unit 2021, the second signal waveform adjustment processing unit 2022 and the parallel-serial conversion unit 2023 illustrated in FIG. 20, have functions which are required during signal reception among functions respectively of the second encoding/decoding processing unit 2121, the second signal waveform adjustment processing unit 2122, and the second serial/parallel conversion unit 2123 illustrated in FIG. 21.

The differential wires 122a and 122b have a function of transferring a digital baseband signal sent from the second transmission/reception circuit 121 to the second dipole antenna 123. The differential wires 122a and 122b also have a function of transferring a digital baseband signal sent from the second dipole antenna 123 to the second transmission/reception circuit 121.

The second dipole antenna 123 performs transmission and reception of digital baseband signals with the first dipole antenna 113 using near-field coupling.

As illustrated in FIG. 1, the second dipole antenna 123 includes a third antenna element 124a, a fourth antenna element 124b, a wire 125 and a terminator 126, which is inserted into the wire 125.

The third antenna element 124a is a fan-shaped quarter circle conductive plate of radius 4 mm.

As illustrated in FIG. 1, a contact point with the differential wire 122a at one end of an arc-shaped edge of the third antenna element 124a is an electrical supply point for the third antenna element 124a.

The fourth antenna element 124b is a fan-shaped quarter circle conductive plate of radius 4 mm.

As illustrated in FIG. 1, a contact point with the differential wire 122b at one end of an arc-shaped edge of the fourth antenna element 124b is an electrical supply point for the fourth antenna element 124b.

The third antenna element 124a and the fourth antenna element 124b are each connected to the wire 125 at an opposite end of the arc-shaped edge thereof to the end at which the electrical supply point is located.

The terminator 126 is inserted into the wire 125.

The terminator 126 is a resistive element. Resistance of the terminator 126 differs depending on an antenna characteristic which is desired.

Although not illustrated in the drawings, the second contactless communication device 120 may include other elements (for example a memory or a circuit having another function).

The first device holder 101 and the second device holder 102 hold the first contactless communication device 110 and the second contactless communication device 120 in order that the first dipole antenna 113 and the second dipole antenna 123 are held in opposing positions, with a spacing (referred to below as a gap) of approximately 0.5 mm therebetween. The Device holders are provided in order to hold the contactless communication devices so that the antennas thereof are in opposing positions and a gap between the antennas is maintained. However, so long as the device holders perform the above function, the device holders are not limited to the configuration described in the present embodiment.

The first dipole antenna 113 and the second dipole antenna 123 may alternatively each be configured as a coil antenna formed from a wire and respectively exhibiting the same antenna characteristic as the first dipole antenna 113 and the second dipole antenna 123. In a configuration in which coil antennas are used, a frequency band which avoids a resonant frequency of the coil antennas is used for communications in the same way as in the configuration in which dipole antennas are used.

For a communication system which uses resonance effects of an antenna, an output impedance of a transmission/reception circuit, a characteristic impedance of a wire between the antenna and the transmission/reception circuit, and an input impedance of a reception circuit are each commonly set at 50Ω due to a characteristic impedance of the antenna also being 50Ω at a resonance frequency of the antenna. In contrast to the above, the dipole antenna relating to the present invention is required to be able to transmit over a wide frequency band, and therefore characteristic impedance of the dipole antenna is for example on a scale of tens to hundreds of ohms as illustrated in FIG. 3B. In order to prevent reflection of transmission signals and reception signals in the first dipole antenna 113 and the second dipole antenna 123, input impedance and output impedance of the first transmission/reception circuit 113 and the second transmission/reception circuit 123, and differential impedance of the differential wires 112a, 112b, 122a and 122b may be set as an intermediate value between upper and lower limits for antenna impedance of a used frequency band, for example 150Ω. Alternatively, the above may be set in accordance with a maximum value of an input impedance or an output impedance on a side of the first device. The above impedance values are set in order to prevent reflection in the transmission path to the antennas and may be between 50Ω to 600Ω, and preferably between 100Ω to 400Ω. For example, in FIG. 4B the impedance value is set at 540Ω and in FIG. 5B the impedance value is set at 200 Ω.

Shape and Communication Properties of Various Dipole Antennas Relating to the First Embodiment Shape of the first dipole antenna 113 and the second dipole antenna 123 explained above with reference to FIG. 1 is only one example thereof. The following explains possible shapes of the first dipole antenna 113 and the second dipole antenna 123 relating to the first embodiment and communication characteristics thereof. Below explanation is given using the first dipole antenna 113. The second dipole antenna 123 has the same shape and configuration as the first dipole antenna 113, therefore explanation is omitted for the second dipole antenna 123. In FIGS. 2A, 3A, 4A, 5A, 6A and 7A distinction is made between each of the elements in order to clarify explanation, but the elements may alternatively be configured as a single element. For example, a differential wire 112a, a first antenna element 114a and a wire 115 illustrated in FIG. 4A may all be realized by a single printed foil. Elements which are illustrated in contact with one another in FIGS. 2A, 3A, 4A, 5A, 6A and 7A are elements which are electrically connected to one another.

Figure 2A:
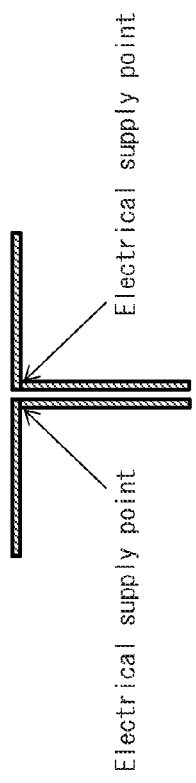
FIG. 2A illustrates shape of a dipole antenna.
Figure 2C:
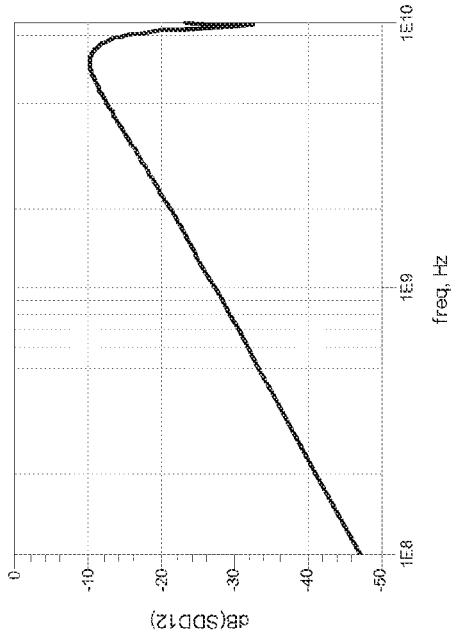
FIG. 2C illustrates a differential transmission characteristic of the dipole antenna.
Figure 2B:
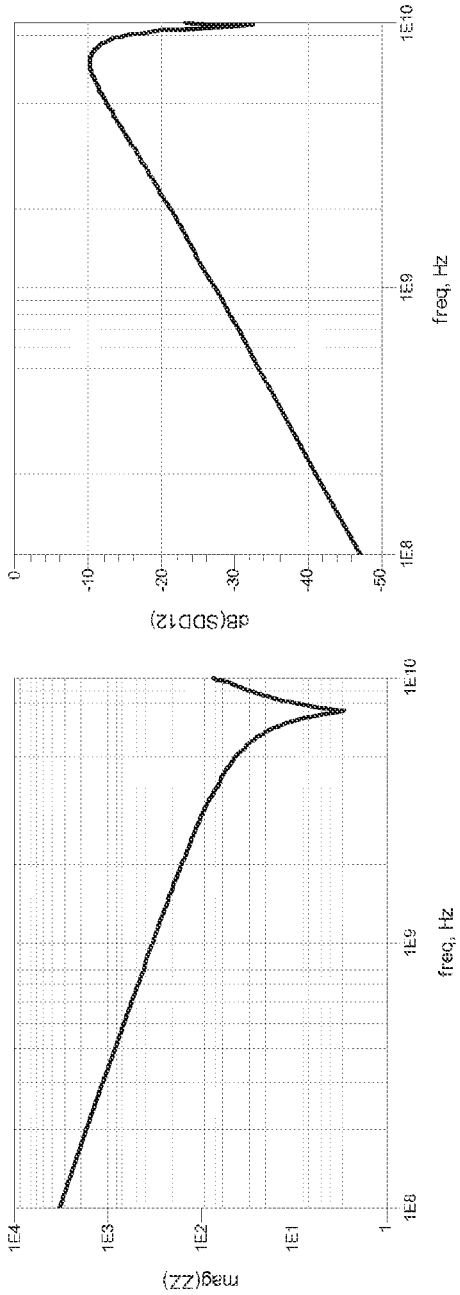
FIG. 2B illustrates an antenna characteristic of the dipole antenna.

The following explains a communication characteristic of a standard dipole antenna with reference to FIGS. 2A-2C.

FIG. 2A illustrates shape of the standard dipole antenna. In the dipole antenna illustrated in FIG. 2A, a first antenna element 114a and a second antenna element 114b each have an antenna length of 4 mm.

FIG. 2B illustrates a differential impedance characteristic (Zdd11) for the dipole antenna illustrated in FIG. 2A. FIG. 2C illustrates a differential transmission characteristic (Sdd12)

for when the dipole antenna illustrated in FIG. 2A is used as the first dipole antenna 113 and the second dipole antenna 123 illustrated in FIG. 1.

As illustrated in FIG. 2B, for the standard dipole antenna resonance occurs at a specific frequency in the antenna characteristic. FIG. 2B indicates that the resonant frequency for the dipole antenna illustrated in FIG. 2A is 7.5 GHz.

For contactless communication using near-field coupling, a differential transmission characteristic of at least −10 dB is preferable. As illustrated in FIG. 2C, at no frequency is the differential transmission characteristic at least −10 dB, thus indicating that the dipole antenna illustrated in FIG. 2A is not well suited for use in contactless communication. FIG. 2C also illustrates that at frequencies greater than the resonant frequency a rapid fall-off in the differential transmission characteristic occurs. In contactless communication a rapid fall-off in the differential transmission characteristic may also potentially hinder communications, therefore the fall-off should preferably be as small as possible.

In view of the above, FIG. 3A illustrates a first dipole antenna 113 including antenna elements 114a and 114b which are each a fan-shaped quarter circle of radius 4 mm.

FIGS. 3B and 3C respectively illustrate a differential impedance characteristic and a differential transmission characteristic when the first dipole antenna 113 illustrated in FIG. 3A is used.

The differential impedance characteristic illustrated in FIG. 3B clearly exhibits more gradual variation than the differential impedance characteristic illustrated in FIG. 2B. The differential transmission characteristic illustrated in FIG. 3C exceeds −10 dB at frequencies between 1 GHz and 6 GHz, indicating suitability for communications in a frequency band of 1 GHz to 6 GHz. The above frequency band corresponds to the section F1 explained using FIG. 17, in which the attenuation factor is low and variation of the antenna characteristic is small.

Figure 4A:
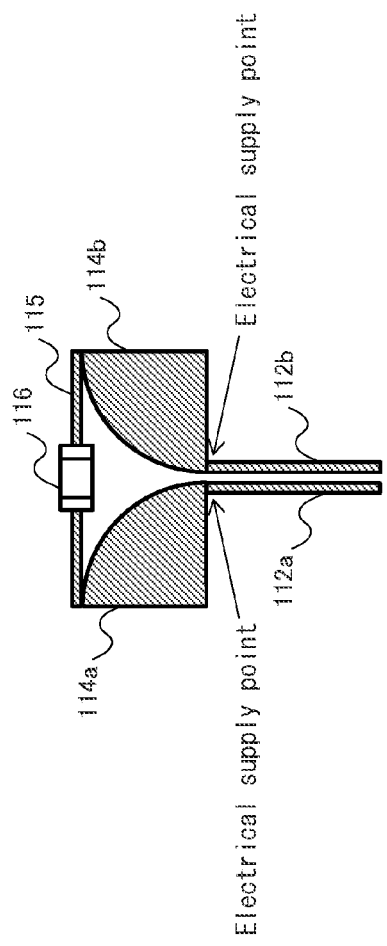
FIG. 4A illustrates shape of a dipole antenna.
Figure 4B:
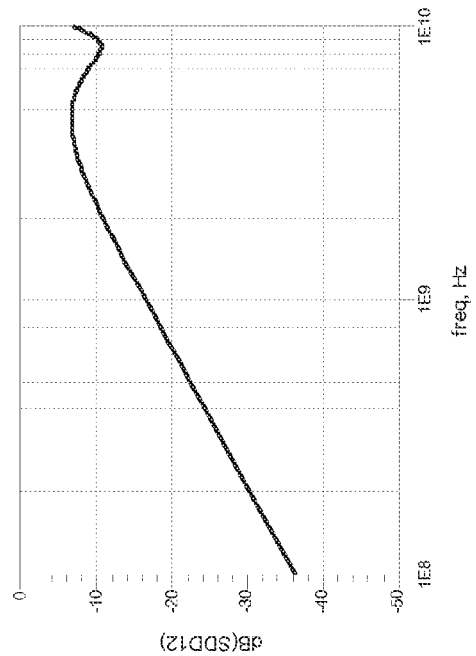
FIG. 4B illustrates an antenna characteristic of the dipole antenna.
Figure 4C:
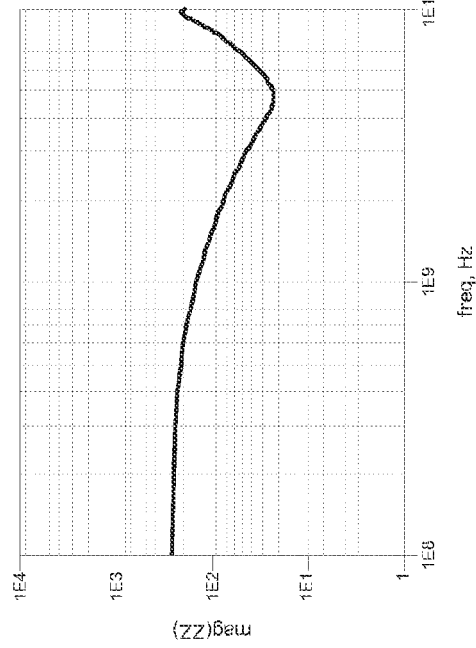
FIG. 4C illustrates a differential transmission characteristic of the dipole antenna.

FIGS. 4A-4C illustrate characteristics when a dipole antenna of the same shape as the first dipole antenna 113 illustrated in FIG. 1 is used.

FIG. 4A illustrates a first dipole antenna 113 which, in addition to the shape illustrated in FIG. 3A, also includes a wire 115 which connects antenna elements 114a and 114b, and a terminator 116, which is inserted into the wire 115.

The terminator 116 is a resistive element of resistance 540 Ω.

FIGS. 4B and 4C respectively illustrate a differential impedance characteristic and a differential transmission characteristic for when the first dipole antenna 113 illustrated in FIG. 4A is used.

FIG. 4C illustrates clearly that when the first dipole antenna 113 illustrated in FIG. 4A is used, the differential transmission characteristic is at least −10 dB in a frequency band from 1.5 GHz to 6.5 GHz. The above frequency band corresponds to the section F1 explained using FIG. 17, in which the attenuation factor is low and variation of the antenna characteristic is small.

FIG. 5A illustrates a first dipole antenna 113 of the same configuration as illustrated in FIG. 4A. However, a terminator 116 in FIG. 5A has a resistance of 200Ω. FIGS. 5B and 5C respectively show a differential impedance characteristic and a differential transmission characteristic for when the first dipole antenna 113 illustrated in FIG. 5A is used.

FIG. 5C illustrates clearly that when the first dipole antenna 113 illustrated in FIG. 5A is used, the differential transmission characteristic is at least −10 dB in a frequency band from 2 GHz to 7.5 GHz. The above frequency band corresponds to the section F1 explained using FIG. 17, in which the attenuation factor is low and variation of the antenna characteristic is small.

As explained above, resistance of the terminator 116 should be determined based on antenna impedance of a frequency band to be used, so that transmission is performed while also preventing reflection in the antenna and differential wires from an output circuit.

Figure 6A:
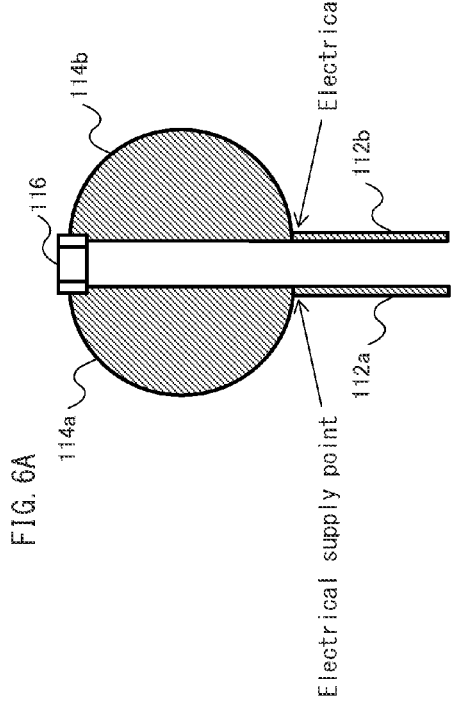
FIG. 6A illustrates shape of a dipole antenna.
Figure 6B:
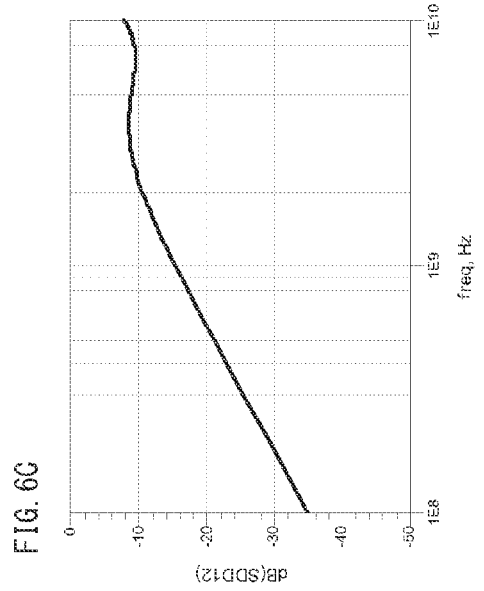
FIG. 6B illustrates an antenna characteristic of the dipole antenna.

Alternatively, as illustrated in FIGS. 6A and 7A, a first dipole antenna 113 relating to the present invention may have antenna elements 114a and 114b which are each a semicircular conductive plate.

Figure 6C:
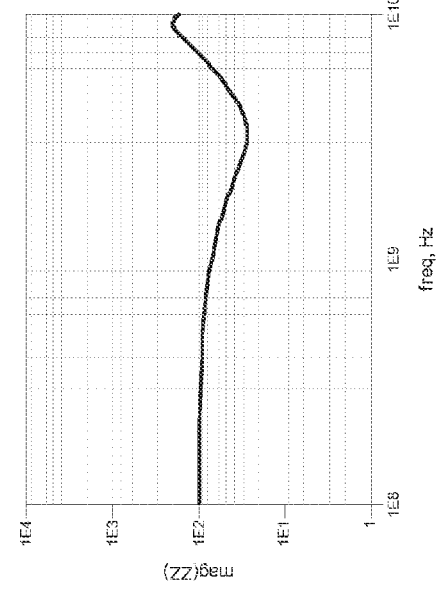
FIG. 6C illustrates a differential transmission characteristic of the dipole antenna.

As illustrated in FIGS. 6C and 7C, differential transmission characteristics for the first dipole antennas 113 illustrated in FIGS. 6A and 7A are at least −10 dB in frequency bands of 1.5 GHz to 6 GHz and 0.5 GHz to 5.5 GHz respectively. The frequency bands each correspond to the section F1 explained using FIG. 17, in which the attenuation factor is low and variation of the antenna characteristic is small. For the first dipole antenna 113 illustrated in FIG. 6A, a resistive element 116 is directly connected to an antenna element 114a and an antenna element 114b, instead of being connected by insertion into a wire 115.

If a frequency band used for a transmitted waveform cannot be prevented from overlapping with the resonant frequency of the antenna illustrated in FIG. 17, transmission characteristics are amplified in a frequency band in which resonance effects occur, thus causing distortion of a received waveform. In order to reduce the above distortion, preferably resonance effects should be restricted as much as possible or the antenna should be improved so that resonance effects occur in a narrower band in which frequency components of the transmitted waveform are small, and frequency bands such as the sections F1 and F2 shown in FIG. 17 should be used for transmission.

Summary of the First Embodiment

As explained above, the contactless communication system 100 relating to the present invention uses dipole antennas, and therefore does not require a ground such as required for the slot antennas in Patent Literature 1. Consequently, antenna size can be reduced in the contactless communication system 100 compared to in Patent Literature 1.

Furthermore, for a standard dipole antenna, antenna length is set at ½ wavelength of a communication frequency to be used in communications, in order that resonance occurs at the communication frequency. In contrast to the above, for the dipole antenna relating to the present invention, antenna length of each of two antenna elements configuring the dipole antenna is intentionally set as less than ¼ of wavelength of a clock frequency of digital baseband signals which are transmitted and received. In other words, antenna length of the dipole antenna relating to the present invention is set as less than ½ wavelength of the clock frequency of digital baseband signals which are transmitted and received. Through the above, reduction in communication accuracy of contactless communication which occurs in standard wireless communications using resonance effects due to resonance effects of the antenna can be prevented. Furthermore, as illustrated in FIGS. 3A-3C, 4A-4C, 5A-5C, 6A-6C and 7A-7C, stable communications can be performed over a wide frequency band (the frequency band in which the differential transmission characteristic is at least −10 dB). Consequently, the contactless communication system in the first embodiment demonstrates properties appropriate for use as a contactless communication system which performs contactless communication through near-field coupling.

Furthermore, by connecting two antenna elements configuring the dipole antenna using a terminator which has a resistance set in accordance with antenna impedance of a frequency band to be used in communications, rapid decrease of the differential transmission characteristic can be prevented. Thus, a smoother differential transmission characteristic can be achieved which is suitable for implementing communications over a wider frequency band.

Second Embodiment

A contactless communication system 200 suitable for performing transmission and reception of digital baseband signals is disclosed in a second embodiment.

FIG. 8 is an overview diagram illustrating configuration of the contactless communication system 200 relating to the second embodiment.

In addition to the configuration of the contactless communication system 100, the contactless communication system 200 further includes a first loop antenna 119 connected to the first transmission/reception circuit 111 through differential wires 117a and 117b, and a second loop antenna 129 connected to the second transmission/reception circuit 121 through differential wires 127a and 127b. Herein, elements and functions which are the same as in the first embodiment are labeled using the same reference signs and explanation thereof is omitted. A terminator 118 is inserted into the first loop antenna 119 at a point furthest from an electrical supply point for the first loop antenna 119. Also, a terminator 128 is inserted into the second loop antenna 129 at a point furthest from an electrical supply point for the second loop antenna 129.

In addition to functions described in the first embodiment, the first transmission/reception circuit 111 also has additional functions described below.

The first transmission/reception circuit 111 has a function of transmitting along the differential wires 117a and 117b, a digital baseband signal addressed to the second transmission/reception circuit 121, and a function of receiving from the differential wires 117a and 117b, a digital baseband signal transmitted from the second transmission/reception circuit 121.

In addition to functions described in the first embodiment, the second transmission/reception circuit 121 also has additional functions described below.

The second transmission/reception circuit 121 has a function of transmitting along the differential wires 127a and 127b, a digital baseband signal addressed to the first transmission/reception circuit 111, and a function of receiving from the differential wires 127a and 127b, a digital baseband signal transmitted from the first transmission/reception circuit 111.

Information included in a signal transmitted between the two dipole antennas is different from information included in a signal transmitted between the two loop antennas. Communications using the dipole antennas and communications using the loop antennas respectively use electric field and magnetic field for transmission and reception of electromagnetic waves, therefore interference therebetween is negligible. In other words, the contactless communication system 200 relating to the second embodiment has a configuration which performs communications between the dipole antennas and communications between the loop antennas, thereby implementing two communication lines.

Figure 11:
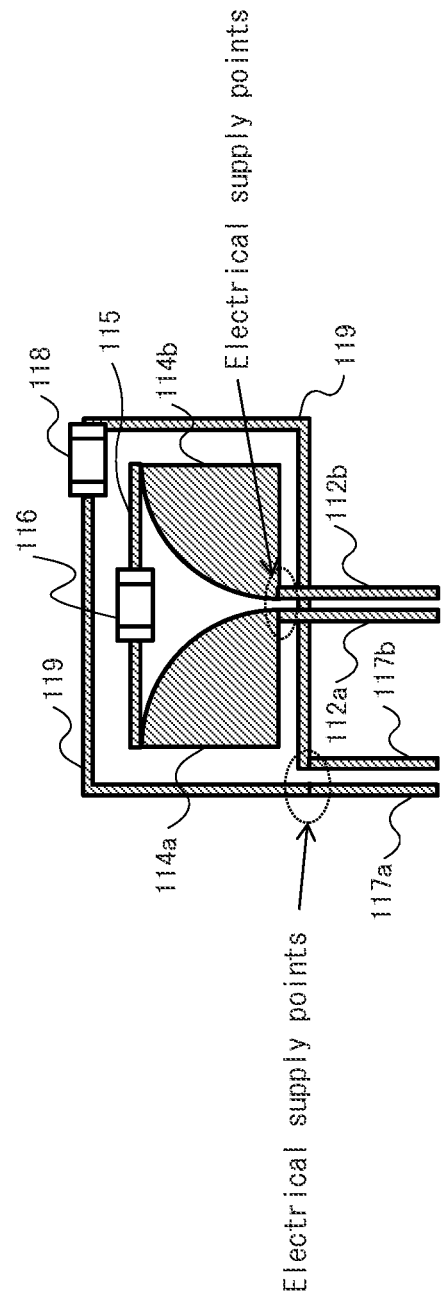
FIG. 11 illustrates another example of shape of an antenna relating to the second embodiment.

Shape and Communication Properties of Various Dipole Antennas and Loop Antennas Relating to the Second Embodiment FIGS. 9A, 10A and 11 illustrate examples of antennas relating to the second embodiment. FIGS. 9B and 9C respectively illustrate a differential impedance characteristic and a differential transmission characteristic for a loop antenna when the antennas illustrated in FIG. 9A are used. FIGS. 10B and 10C respectively illustrate a differential impedance characteristic and a differential transmission characteristic for a loop antenna when the antennas illustrated in FIG. 10A are used. Antenna characteristics for dipole antennas illustrated in FIGS. 9A, 10A and 11 are the same as in the first embodiment, therefore further illustration is omitted. In FIGS. 9A, 10A and 11, distinction is clearly made between elements, but the elements may alternatively be configured as a single element. For example, a differential wire 112a, an antenna element 114a and a wire 115 illustrated in FIG. 9A may all be realized as a single printed foil.

Elements which are illustrated in contact with one another in FIGS. 9A, 10A and 11 are elements which are electrically connected. Note that in each of FIGS. 9A, 10A and 11, a loop antenna 119 is not connected to differential wires 112a and 112b.

The following uses the first dipole antenna 113 and the first loop antenna 119 for explanation. The second dipole antenna 123 and the second loop antenna 129 have the same shape and configuration as the first dipole antenna 113 and the first loop antenna 119 respectively, therefore explanation thereof is omitted below.

FIG. 9A illustrates an antenna configuration in which a first loop antenna 119 is disposed surrounding the first dipole antenna 113 relating to the first embodiment illustrated in FIG. 6A.

FIGS. 9B and 9C respectively illustrate a differential impedance characteristic and a differential transmission characteristic of the first loop antenna 119 illustrated in FIG. 9A.

FIG. 9C illustrates that for communications using the loop antenna illustrated in FIG. 9A, the differential transmission characteristic is at least −10 dB in a frequency band from approximately 1.5 GHz to 6 GHz, and therefore communications can be performed favorably.

FIG. 10A illustrates an antenna configuration in which a first loop antenna 119 is disposed surrounding the first dipole antenna 113 relating to the first embodiment illustrated in FIG. 7A.

FIGS. 10B and 10C respectively illustrate a differential impedance characteristic and a differential transmission characteristic of the first loop antenna 119 illustrated in FIG. 10A.

FIG. 10C illustrates that for communications using the loop antenna illustrated in FIG. 10A, the differential transmission characteristic is at least −10 dB in a frequency band from approximately 1.5 GHz to 6 GHz, similar to in FIG. 9A, and therefore communication can be performed favorably.

Furthermore, in another example of antennas relating to the second embodiment, a configuration may be used in which a first loop antenna 119 is disposed surrounding the first dipole antenna 113 relating to the first embodiment illustrated in FIG. 4A or FIG. 5A.

Summary of the Second Embodiment

The contactless communication system 200 relating to the second embodiment is able to transmit and receive signals through two different communication lines by additionally using loop antennas. Therefore, the contactless communication system 200 relating to the second embodiment provides a contactless communication system with increased communication efficiency.

Furthermore, by disposing each loop antenna surrounding a corresponding dipole antenna, the contactless communication system 200 can be designed in a manner which reduces required installation space.

Third Embodiment

A third embodiment discloses a contactless communication system 300 which achieves improved communication reliability.

In the third embodiment, configurations which are the same as in the first embodiment are labeled using the same reference signs and explanation thereof is omitted.

Figure 12:
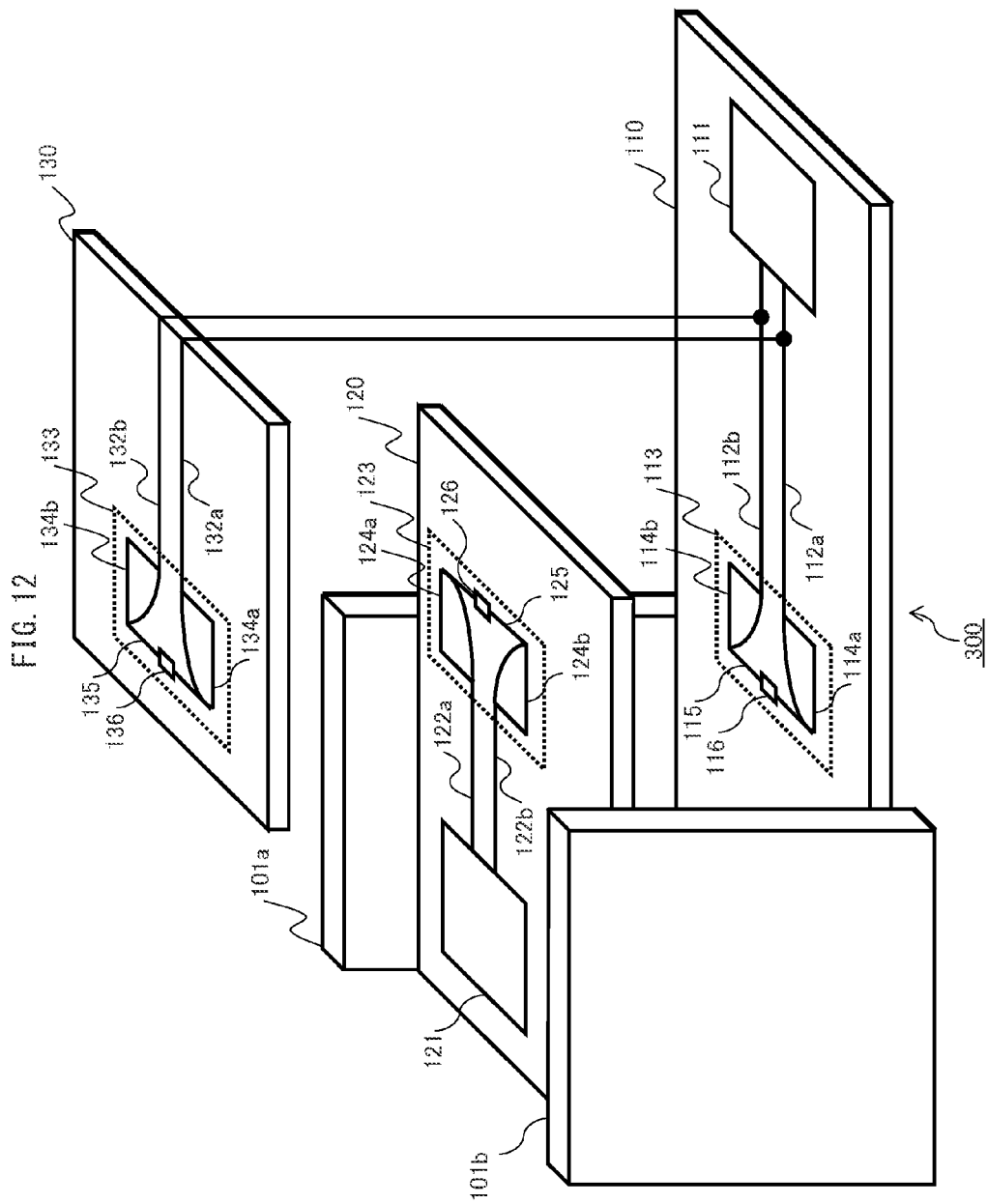
FIG. 12 is an overview diagram illustrating configuration of a contactless communication system relating to a third embodiment.
Figure 13:
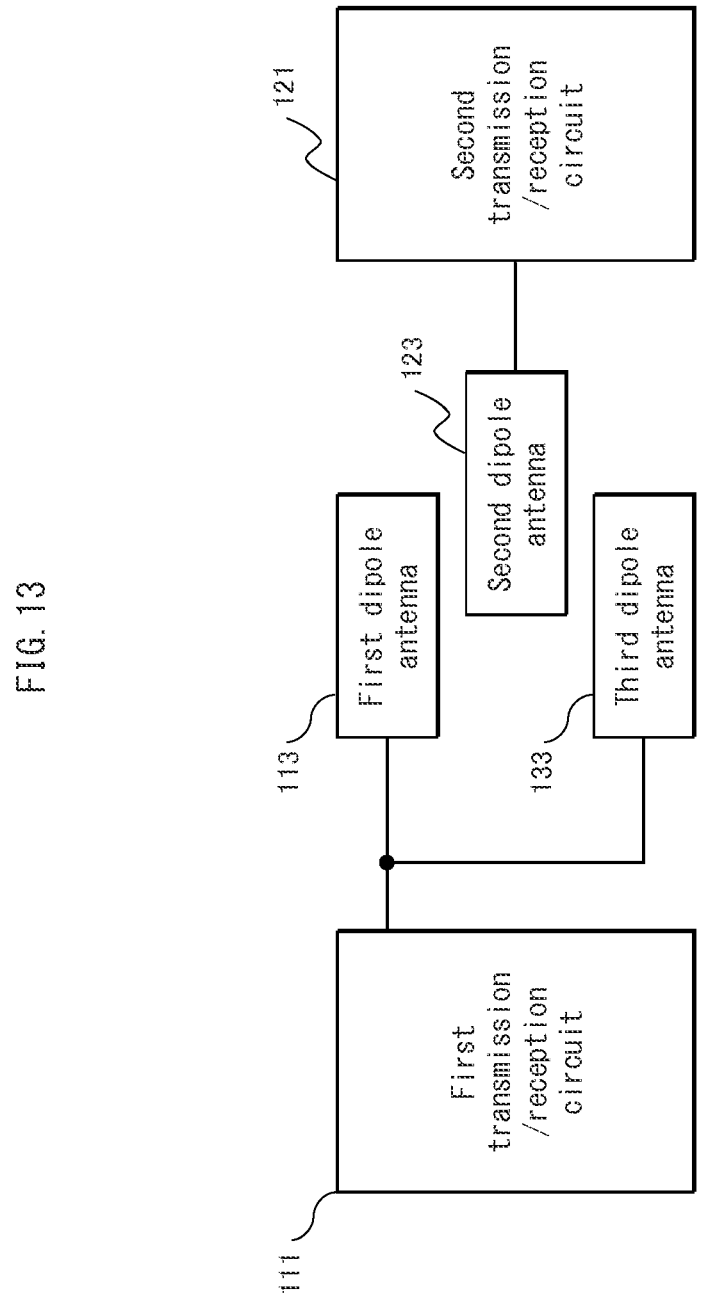
FIG. 13 is a functional block diagram illustrating an example of functional configuration of the contactless communication system relating to the third embodiment.

FIG. 12 is an overview diagram illustrating configuration of the contactless communication system 300 relating to the third embodiment. As illustrated in FIG. 12, in addition to the configuration of the contactless communication system 100, the contactless communication system 300 also further includes a third contactless communication device 130.

The third contactless communication device 130 includes differential wires 132a and 132b, and a third dipole antenna 133.

The third dipole antenna 133 has the same configuration as the first dipole antenna 113 and the second dipole antenna 123, and performs transmission and reception of digital baseband signals with the second dipole antenna 112 using near-field coupling.

The third dipole antenna 133 includes a fifth antenna element 134a, a sixth antenna element 134b, a wire 135 and a terminator 136, which is inserted into the wire 135.

The fifth antenna element 134a is a fan-shaped quarter circle conductive plate of radius 4 mm.

As illustrated in FIG. 12, a contact point with the differential wire 132a at one end of an arc-shaped edge of the fifth antenna element 134a is an electrical supply point for the fifth antenna element 134a.

The sixth antenna element 134b is a fan-shaped quarter circle conductive plate of radius 4 mm.

As illustrated in FIG. 12, a contact point with the differential wire 132b at one end of an arc-shaped edge of the sixth antenna element 134b is an electrical supply point for the sixth antenna element 134b.

The fifth antenna element 134a and the sixth antenna element 134b are each connected to the wire 135 at an opposite end of the arc-shaped edge thereof to the end at which the power supply point is located.

The terminator 136 is inserted into the wire 135.

The terminator 136 is a resistive element. Resistance of the terminator 136 differs depending on an antenna characteristic which is desired.

The differential wires 132a and 132b are connected to the first transmission/reception circuit 111. As illustrated in FIG. 12, a section of the differential wire 112a is shared by the differential wire 132a. In the same way, a section of the differential wire 112b is shared by the differential wire 132b. The differential wire 112a and the differential wire 132a are equal in length in terms of distance to a corresponding antenna element from a divergence point of the differential wire 112a from the differential wire 132a. The differential wire 112b and the differential wire 132b are equal in length in terms of distance to a corresponding antenna element from a divergence point of the differential wire 112b from the differential wire 132b. Note that the above lengths are not illustrated as being equal in FIG. 12 in order to simplify drawing.

By setting the differential wire 112a and the differential wire 132a to be equal in length and also the differential wire 112b and the differential wire 132b to be equal in length, phase difference of a signal communicated between the first dipole antenna 113 and the second dipole antenna 123, and a signal communicated between the second dipole antenna 123 and the third dipole antenna 133 is negligible. Consequently, communication accuracy can be improved by using both the first dipole antenna 113 and the third dipole antenna 133. In other words, a signal transmitted by the first dipole antenna 113 and a signal transmitted by the third dipole antenna 133 can be received by the second dipole antenna 123 at the same timing. Also, a signal transmitted by the second dipole antenna 123 can be received by the first dipole antenna 113 and the third dipole antenna 133 at the same timing, and consequently the first transmission/reception circuit 111 can receive a signal which is composited without phase difference.

Note that the third contactless communication device 130 is held by the device holders 101a and 101b, however in order to simply drawing, the third contactless communication device 130 is not illustrated as being held by the device holders 101a and 101b in FIG. 12.

Summary of the Third Embodiment

The contactless communication system 300 relating to the third embodiment is able to improve communication reliability compared to the contactless communication system 200 relating to the second embodiment and the contactless communication system 100 relating to the first embodiment, due to being able to select a dipole antenna most suitable for communication from among two dipole antennas.

For example, assume a situation in which the first contactless communication device 110 and the third contactless communication device 130 are located in a slot of a PC (Personal Computer), and the second contactless communication device 120 is a recording medium which is insertable in the slot, such as an SD memory card. When the memory card is inserted into the slot, the second dipole antenna may be closer to one or other of the dipole antennas located in the slot depending on the insertion method. When the contactless communication system 300 relating to the third embodiment is used in a situation such as described above, communication accuracy of one of the dipole antennas is likely to favorable even if communication accuracy of the other dipole antenna is not favorable. Therefore, improved communication reliability can be expected when the contactless communication system 300 is used.

Modified Examples

The above embodiments were used to explain implementation of the present invention, but embodiments of the present invention are of course not limited to the above. The following explains various modified examples, which in addition to the embodiments described above, are also included within the scope of the present invention.

(1) In the above embodiments, antenna elements with a circular shape, such as a quarter circle or a semi-circle, were used for the dipole antennas in order to achieve an antenna characteristic suitable for communications over a wider frequency band. If antenna elements of a different shape are used, such as triangular or quadrilateral antenna elements, the frequency band suitable for communications is narrower than for antenna elements with a circular shape due to current tending to flow more strongly through shorter sides of the antenna element. Furthermore, if each of the antenna elements is triangular or quadrilateral in shape, reflection of a digital baseband signal may occur at an apex of the antenna element, and therefore a suitable antenna characteristic may not be achievable. For the above reasons, in the Specification of the present invention each of the antenna elements is a quarter circle or a semi-circle.

However, the antenna elements used in the contactless communication device relating to the present invention are not limited to each being a fan-shaped quarter circle, semi-circle or the like. The antenna elements may have a different shape so long as the antenna elements are useable over a wide frequency band and have differential transmission characteristic of at least −10 dB. For example, the antenna elements may alternatively each be a semi-circle having a section thereof cut-away. In order to determine whether an antenna element with a different shape can be used to achieve a preferable communication characteristic, an antenna should be constructed using antenna elements of the different shape and the communication characteristic thereof should be measured in testing.

Antenna length of each of the antenna elements 114*a* and 114*a* in the above embodiments is distance between the electrical supply point and an end point furthest therefrom. For an antenna element which is a quarter circle or a semi-circle as in the above embodiments, electrical current can pass along countless different paths, and therefore communication can be implemented over a wide frequency band.

(2) In the above embodiments the terminators 116 and 126 may alternatively each have a resistance of 0 Ω.

(3) Although not specifically mentioned in the above embodiments, an amplifier may be provided in each pathway connecting the first transmission/reception circuit 111 to an antenna, and each pathway connecting the second transmission/reception circuit 121 to an antenna. Through the above output properties and reception properties of the transmission/reception circuit can be improved. In the above configuration, communication may also be performed using a frequency band in which the differential transmission characteristic is less than −10 dB, and communication can be performed even more favorably in a frequency band in which the differential transmission characteristic is at least −10 dB.

(4) In the above embodiments the dipole antennas and the loop antennas are configured so that each of the dipole antennas and loop antennas can both transmit and receive digital baseband signals. However, communications between each pairing of antennas may alternatively only occur in a single direction. In other words, in an alternative configuration the first contactless communication device 110 may include a transmission circuit instead of the transmission/reception circuit 111 and the second contactless communication device 120 may include a reception circuit instead of the transmission/reception circuit 121. The above configuration may also be reversed so that the first contactless communication device includes the reception circuit and the second contactless communication device includes the transmission circuit. In another configuration, each of the devices may alternatively include a circuit and antenna for transmission only, and also a circuit and antenna for reception only.

Further alternatively, in the configuration in the second embodiment, the dipole antennas may be used for communications from the first contactless communication device 110 to the second contactless communication device 120 and the loop antennas may be used for communications from the second contactless communication device 120 to the first contactless communication device 110.

(5) In the second embodiment, the dipole antennas transmit different data compared to the loop antennas, however alternatively the same data may be used as a source for a signal transmitted between the dipole antennas and a signal transmitted between the loop antennas. In the above configuration the data is partitioned up and each partition of the data is transmitted either between the dipole antennas or between the loop antennas. Thus, transmission speed of a single large set of data can be increased through the above configuration.

(6) In the second embodiment each of the loop antennas is disposed as a single loop surrounding a corresponding dipole antenna, but the loop antenna is not limited to being disposed as a single loop. Alternatively, the number of loops may be determined in accordance with a frequency band used for communications, and each of the loop antennas may for example be disposed as a double loop or a triple loop.

(7) In the second embodiment the differential wire 112*a* (112*b*) and the differential wire 132*a* (132*b*) have a shared section as illustrated in FIG. 12, but the differential wire 112*a* (112*b*) and the differential wire 132*a* (132*b*) may alternatively be wires which are completely separate from one another.

(8) The first transmission/reception circuit 111 in the third embodiment is not limited to the position illustrated in FIG. 12. For example, the first transmission/reception circuit 111 may alternatively be positioned on the third contactless communication device 130. However, even if the first transmission/reception circuit 111 is positioned differently, distance from the first transmission/reception circuit 111 to the first dipole antenna 113 and distance from the first transmission/reception circuit 111 to the third dipole antenna 133 should preferably be equal. In other words, the differential wires 122*a* and 122*b* should preferably be equal in length to the differential wires 132*a* and 132*b*.

(9) In the third embodiment, an additional contactless communication device is added to the configuration described in the first embodiment. Alternatively, the additional contactless communication device may be added to the configuration described in the second embodiment. In other words, in the third embodiment each of the dipole antennas may alternatively be surrounded by a loop antenna and the two different types of antennas may both be used for communications.

Figure 14:
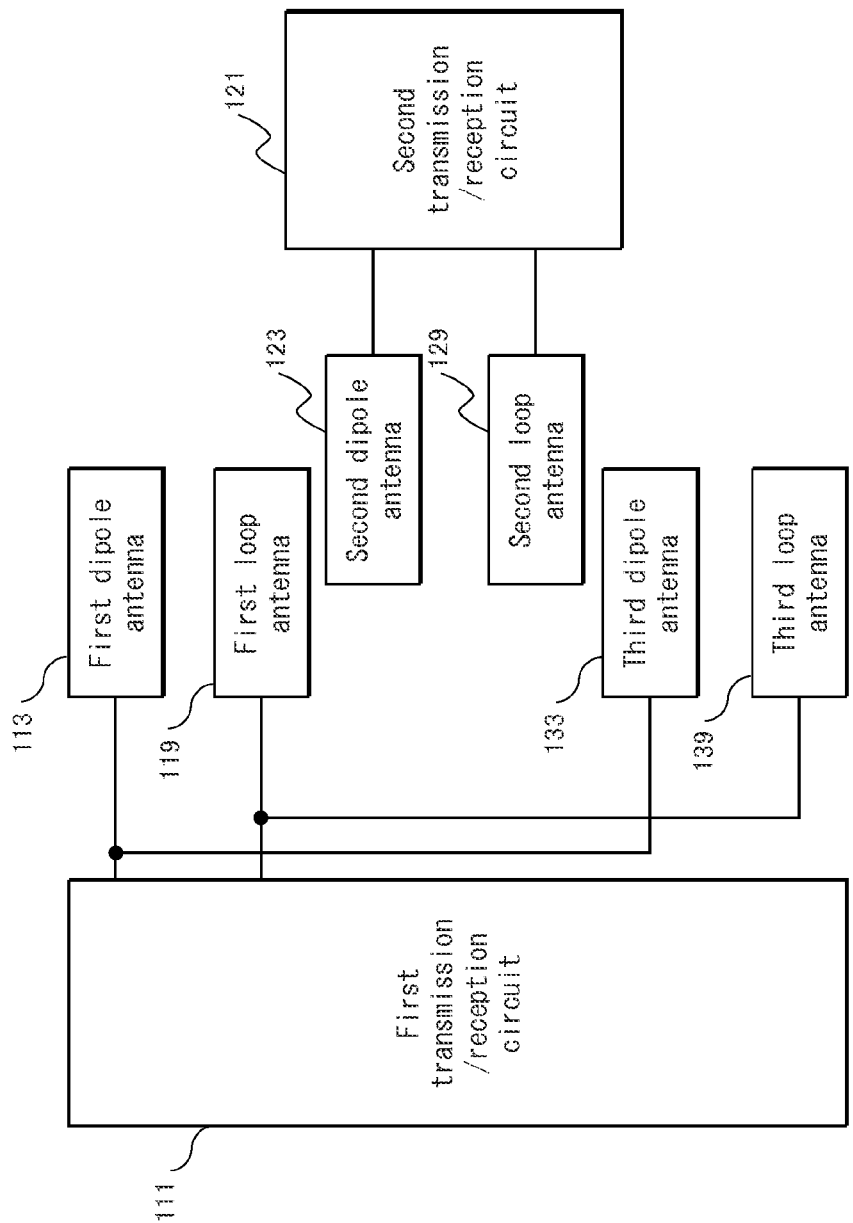
FIG. 14 is a functional block diagram illustrating a modified example of the contactless communication system relating to the third embodiment.

FIG. 14 illustrates functional configuration of a contactless communication system of the type described above.

In the above configuration, a first dipole antenna 113 and a third dipole antenna 133 both perform communications with a second dipole antenna 123. Also, a first loop antenna 119 and a third loop antenna 139 both perform communications with a second loop antenna 129.

(10) The third embodiment and modified example (9) are described for examples in which communications are performed using both the first dipole antenna 113 and the third dipole antenna 133. Therefore, in order that a phase difference for communicated digital baseband signals is negligent, differential wires connecting the first transmission/reception circuit 111 to the first dipole antenna 113 are described as being equal in length to differential wires connecting the first transmission/reception circuit 111 to the third dipole antenna 133.

Use of both antennas may not be possible in a configuration in which the differential wires connecting the first transmission/reception circuit 111 to the first dipole antenna 113 cannot be set equal in length to the differential wires connecting the first transmission/reception circuit 111 to the third dipole antenna 133. The above is due to a phase difference arising between signals communicated between the antennas, which may possibly cause negation of the signals.

Figure 15:
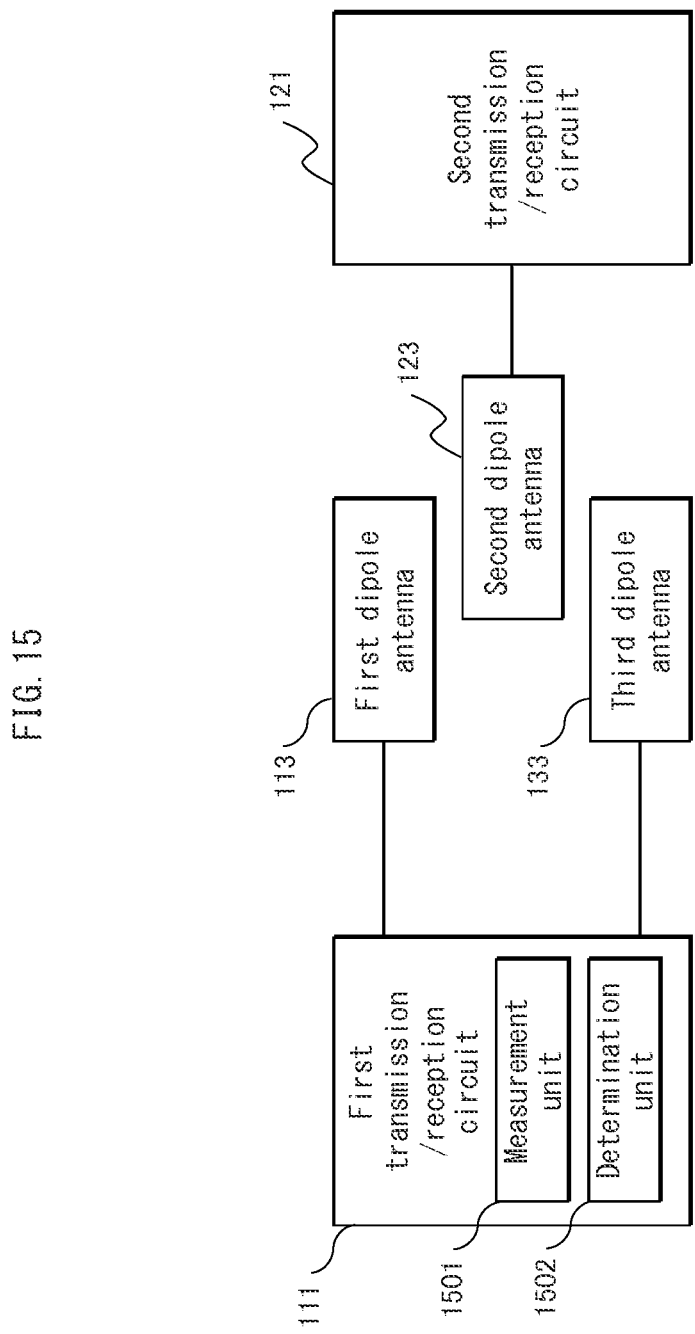
FIG. 15 is a functional block diagram illustrating a modified example of the contactless communication system relating to the third embodiment.
Figure 16:
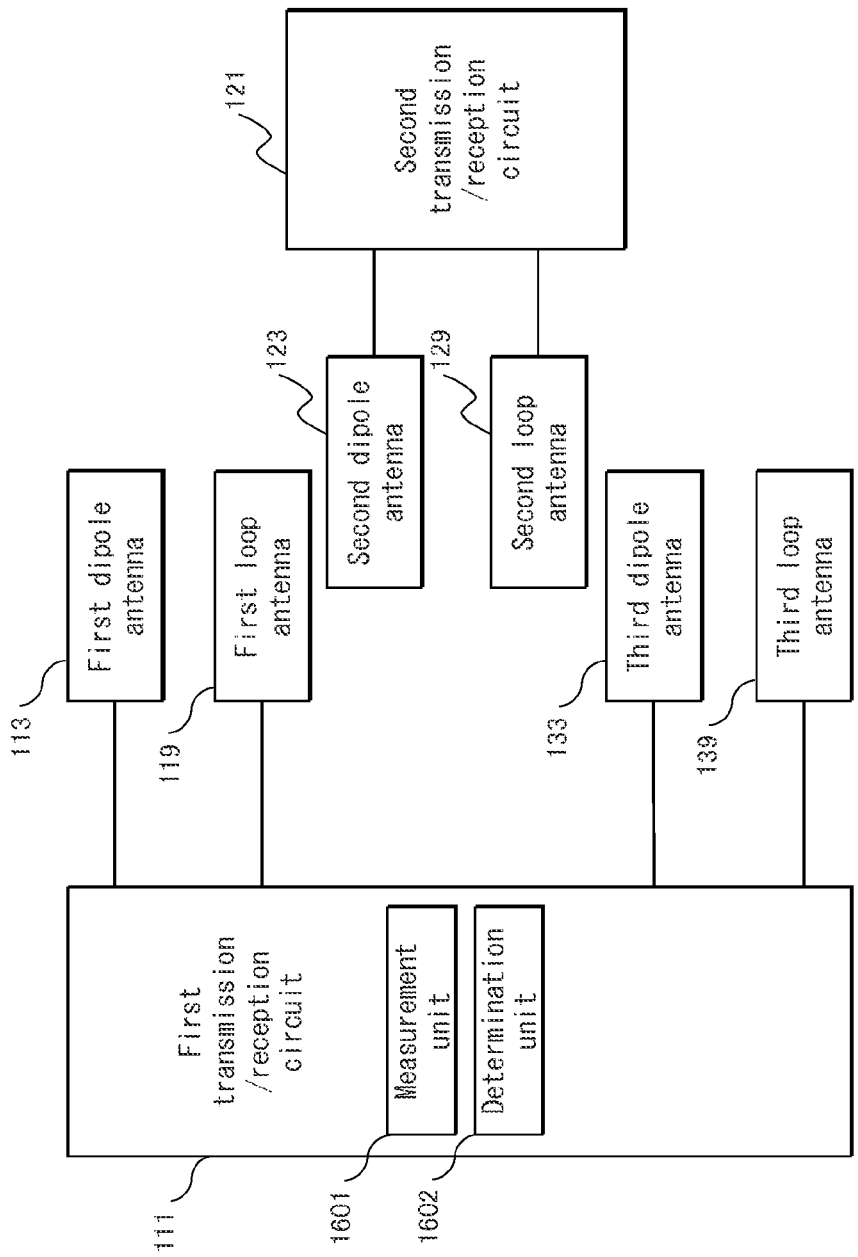
FIG. 16 is a functional block diagram illustrating a modified example of the contactless communication system relating to the third embodiment.

In the above situation, the contactless communication system 300 should be provided with a functional configuration such as shown in FIG. 15 or FIG. 16.

FIG. 15 illustrates an example of the configuration described in the third embodiment in which lengths of the differential wires are not equal. FIG. 16 illustrates an example of the configuration described in modified example (9) in which lengths of the differential wires are not equal.

As illustrated in FIG. 15, a first transmission/reception circuit 111 includes a measurement unit 1501 and a determination unit 1502 in addition to functions described for the first transmission/reception circuit 111 in the third embodiment.

The measurement unit 1501 first causes the first transmission/reception circuit 111 to transmit pre-stored sample data between a first dipole antenna 113 and a second dipole antenna 123, and measures electric field strength. Next, the measurement unit 1501 causes the first transmission/reception circuit 111 to transmit the same sample data between the second dipole antenna 123 and a third dipole antenna 133, and measures electric field strength. The measurement unit 1501 sends results of the two measurements to the determination unit 1502.

The determination unit 1502 determines which out of the first dipole antenna 113 and the third dipole antenna 133 to use when performing communications, by using the results of the measurements by the measurement unit 1501 in order to determine which out of the first dipole antenna 113 and the third dipole antenna 133 has a higher electric field strength.

For modified example (9), functional configuration of a contactless communication system in the above situation is as illustrated in FIG. 16.

As illustrated in FIG. 16, a first transmission/reception circuit 111 includes a measurement unit 1601 and a determination unit 1602.

In addition to the functions described for the measurement unit 1501, the measurement unit 1601 also has a function of measuring electric field strength between loop antennas in the same way as between the dipole antennas, and sending the results of the above measurements to the determination unit 1602.

In addition to the functions described for the determination unit 1502, the determination unit 1602 also has a function of determining which of the loop antennas to use in performing communications by determining which of the loop antennas has a higher electric field strength.

In FIG. 16 the measurement unit 1601 measures electric field strength for the dipole antennas and for the loop antennas, however the measurement unit 1601 may alternatively measure electric field strength only for the dipole antennas or only for the loop antennas. In the above cases communications should be performed using a dipole antenna pairing or a loop antenna pairing for which electric field strength is highest.

(11) In the second contactless communication device 120 relating to the third embodiment, preferably antennas of the same shape should be disposed on both surfaces of a substrate configuring the second contactless communication device 120.

In the above configuration, the antenna patterns on opposite sides of the substrate should be connected to one another through via parts provided at intervals of no greater than a predetermined distance. Preferably the predetermined distance should be no greater than wavelength of a clock frequency of transmitted and received digital baseband signals, multiplied by a factor of 0.1.

(12) In the above embodiments the gap between antennas is set as 0.5 mm, however the gap may be greater than 0.5 mm or less than 0.5 mm, depending on desired communication properties.

(13) In the second embodiment, the first dipole antenna 113 and the first loop antenna 119 may alternatively each be connected to a different transmission/reception circuit. Similarly, the second dipole antenna 123 and the second loop antenna 129 may alternatively each be connected to a different transmission/reception circuit.

(14) In the above embodiments and modified examples, −10 dB is suggested as a standard for favorable communications, but is just one example of a target value. The value of −10 dB for a differential transmission characteristic described in the above embodiments is a target for stable transmission and reception, for example in a situation when transmission in an electrical device such as described in the above embodiments is performed using an LVDS (Low Voltage Differential Signaling) driver or CML (Current Mode Logic). In a situation where a transmission characteristic of a contactless communication device is not at least −10 dB, for example if the transmission characteristic is −20 dB, communications may of course still be possible by improving the overall communication system by 10 dB, for example by improving a driver or receiver characteristic by 10 dB, or by improving properties of both the driver and the receiver.

(15) In the above embodiments, the first transmission/reception circuit 111 and the second transmission/reception circuit 112 respectively include the first serial/parallel conversion unit 2113 and the second serial/parallel conversion unit 2123. However, if data in the first contactless communication device 110 and the second communication device 120 is serial data, inclusion of the first serial/parallel conversion unit 2113 and the second serial/parallel conversion unit 2123 is of course not necessary.

(16) Alternatively, configurations described in the embodiments and the modified examples may be combined.

(17) The following explains one embodiment of the contactless communication system relating to the present invention and effects thereof.

A contactless communication system relating to the present invention comprises a first device and a second device, and performs contactless communication of digital baseband signals between the first device and the second device using near-field coupling, wherein the first device includes: a first antenna operable to transmit a digital baseband signal; and a first communication unit operable to supply the digital baseband signal to the first antenna, the second device includes a second antenna operable to receive the digital baseband signal, and the first communication unit supplies the digital baseband signal to the first antenna without using a resonant frequency of the first antenna.

Through the above configuration, the digital baseband signal is transmitted using a frequency band other than the resonant frequency; the resonant frequency is indicated by a steep antenna characteristic. Therefore, transmission of digital baseband signals can be performed over a wide frequency range.

Herein, frequency of a digital baseband signal refers to an operation clock of a transmission circuit, located on a transmission side, which outputs the digital baseband signal.

Due to the above configuration, the contactless communication system does not require provision of a wide peripheral ground as in Patent Literature 1. Therefore, communication of digital baseband signals can be performed using antennas which are smaller than conventional antennas.

The first communication unit may alternatively supply the digital baseband signal to the first antenna using a frequency band in which an attenuation factor of the first antenna is low and variation of an antenna characteristic of the first antenna is small.

The frequency band, in which variation of the antenna characteristic is small, may alternatively be a frequency band in which the antenna characteristic is within a predetermined range when plotted on a vertical axis against frequency on a horizontal axis.

In the above configurations, a frequency band in which variation of the antenna characteristic is small is used for transmission of the digital baseband signal. Therefore, digital baseband signals can be communicated using any frequency within the frequency band in which variation of the antenna characteristic is small.

The first antenna and the second antenna may alternatively each be configured by one or more antenna elements and may each have an antenna length which is less than ½ of wavelength of a clock frequency of the digital baseband signal.

In the above configuration, by limiting length of the antennas used in contactless communication to less than ½ of the wavelength of the clock frequency of the digital baseband signal, the antennas do not resonate at the clock frequency of the digital signal. Therefore, a contactless communication system can be provided which is suitable for communications using near-field coupling.

The first antenna and the second antenna may alternatively be disposed in opposing positions to one another.

The first antenna and the second antenna may alternatively each be a dipole antenna configured by two antenna elements, the first antenna may include a first wire connecting the two antenna elements configuring the first antenna, the second antenna may include a second wire connecting the two antenna elements configuring the second antenna, and a first terminator may be inserted into the first wire and a second terminator may be inserted into the second wire.

The first wire and the second wire may alternatively be each connected to each of the two antenna elements corresponding thereto, at a part of the antenna element furthest from an electrical supply point thereof.

Through the above configurations, an antenna characteristic can be achieved which is smoother, in other words an antenna characteristic which has smaller variation. Therefore, communication of digital baseband signals can be performed over a wider frequency band.

The first device may alternatively further include a first differential pair consisting of two wires, each of the wires connecting the first communication unit to the electrical supply point of one of the two antenna elements configuring the first antenna, and the second device may further include: a second communication unit operable to receive the digital baseband signal; and a second differential pair consisting of two wires, each of the wires connecting the second communication unit to the electrical supply point of one of the two antenna elements configuring the second antenna.

The first device may alternatively further include a first loop antenna connected to the first communication unit and disposed surrounding the first antenna, and the second device may further include a second loop antenna connected to the second communication unit and disposed surrounding the second antenna.

Through addition of loop antennas such as in the above configuration, communications can be performed more reliably.

A third terminator may alternatively be inserted into the first loop antenna, and a fourth terminator may be inserted into the second loop antenna.

In the above configuration, through insertion of a terminators in each of the first loop antenna and the second loop antenna, an antenna characteristic can be achieved which is smoother, in other words an antenna characteristic which has smaller variation. Therefore, communication of digital baseband signals can be performed over a wider frequency band.

The first device may alternatively further include a third antenna operable to transmit the digital baseband signal to the second antenna, the second antenna may be disposed between the first antenna and the third antenna, an electrical supply point of an antenna element configuring the third antenna may be connected to the first communication unit, and the first communication unit may transmit the digital baseband signal to the second antenna using the first antenna and the third antenna.

In the above configuration, the digital baseband signal can be transmitted to the second antenna using both the first antenna and the third antenna. Therefore, the contactless communication system is able to communicate digital basebands signals more reliably.

The third antenna may alternatively be a dipole antenna configured by two antenna elements, and the third antenna may include a third wire which connects the two antenna elements configuring the third antenna.

A third terminator may alternatively be inserted into the third wire.

Through the above configurations, an antenna characteristic of the third antenna can be achieved which is smoother, thus allowing communications between the third antenna and the second antenna to be performed over a wider frequency band.

The first device may alternatively further include: a first loop antenna connected to the first communication unit and disposed surrounding the first antenna; and a third loop antenna connected to the first communication unit and disposed surrounding the third antenna, and the second device may further include a second loop antenna connected to the second communication unit and disposed surrounding the second antenna.

Through addition of loop antennas such as in the above configuration, communications can be performed more reliably.

A third terminator may alternatively be inserted into the first loop antenna, a fourth terminator may be inserted into the second loop antenna, and a fifth terminator may be inserted into the third loop antenna.

Through insertion of a terminator into each of the loop antennas, an antenna characteristic thereof can be achieved which is smoother. Therefore, the contactless communication system can perform communications over a wider frequency band.

A wire connecting the first communication unit to the electrical supply point of the antenna element configuring the third antenna may alternatively be equal in length to each of the two wires constituting the first differential pair.

Through the above configuration, transmission of a digital baseband signal supplied to both the first antenna and the third antenna can be performed without need to provide a circuit for synchronization.

The first communication unit may alternatively be further operable to: judge which out of the first antenna and the third antenna has higher communication strength by comparing communication strength of communications with the second antenna for the first antenna and the third antenna; and transmit the baseband digital signal to the second antenna using whichever of the first antenna and the third antenna has higher communication strength.

Through the above configuration, communication of digital baseband signals can be performed more reliably.

The second communication unit may alternatively be further operable to supply a digital baseband signal to the second antenna, the second antenna may be further operable to transmit the digital baseband signal supplied from the second communication unit, the first antenna may be further operable to receive the digital baseband signal transmitted from the second antenna, and the first communication unit may be further operable to receive the digital baseband signal received by the first antenna.

Through the above configuration, the first communication unit and the second communication unit are both able to transmit and receive digital baseband signals.

A dipole antenna relating to the present invention comprises: two antenna elements which are fan-shaped; and a wire which has a terminator inserted therein and which connects one end of an arc-shaped edge of one of the antenna elements to one end of an arc-shaped edge of the other of the antenna elements, wherein for each of the antenna elements, the other end of the arc-shaped edge is an electrical supply point of the antenna element, and the dipole antenna transmits or receives a digital baseband signal without using a resonant frequency of an antenna configured by the two antenna elements.

In the dipole antenna described above, an antenna length of each of the antenna elements may alternatively be less than ¼ of wavelength of a clock frequency of the digital baseband signal which is transmitted or received.

INDUSTRIAL APPLICABILITY

The contactless communication system relating to the present invention may be used for example to achieve inter-layer communications in a multi-layer substrate or communications between a reader/writer and a memory card, without use of wires.

REFERENCE SIGNS LIST 100, 200, 300 contactless communication system
101a, 101b device holder
110 first contactless communication device (first device)
111 first transmission/reception circuit (first communication unit)
112a, 112b differential wire
113 first dipole antenna
114a first antenna element
114b second antenna element
115 wire
116 terminator
117a, 117b differential wire
118 terminator
119 first loop antenna
120 second contactless communication device (second device)
121 second transmission/reception circuit (second communication unit)
122a, 122b differential wire
123 second dipole antenna
124a third antenna element
124b fourth antenna element
125 wire
126 terminator
127a, 127b differential wire
128 terminator
129 second loop antenna
130 third contactless communication device (third device)
132a, 132b differential wire
133 second dipole antenna
134a fifth antenna element
134b sixth antenna element
135 wire
136 terminator
1501, 1601 measurement unit
1502, 1602 determination unit (comparison unit)
2011 encoding processing unit
2012 first signal waveform adjustment processing unit
2013 parallel-serial conversion unit
2021 decoding processing unit
2022 second signal waveform adjustment processing unit
2023 serial-parallel conversion unit
2111 first encoding/decoding processing unit
2112 first signal waveform adjustment processing unit
2113 first serial/parallel conversion unit
2121 second encoding/decoding processing unit
2122 second signal waveform adjustment processing unit
2123 second serial/parallel conversion unit

The invention claimed is:

1. A contactless communication system comprising a first device and a second device, and performing contactless communication of digital baseband signals between the first device and the second device using near-field coupling, wherein
the first device includes:
a first antenna operable to transmit a digital baseband signal; and
a first communication unit operable to supply the digital baseband signal to the first antenna,
the second device includes a second antenna operable to receive the digital baseband signal, and
the first communication unit supplies the digital baseband signal to the first antenna by using a predetermined frequency band not including a resonant frequency of the first antenna, the predetermined frequency band being selected from among a plurality of frequency bands where a differential transmission characteristic of the first antenna exhibits a relatively small variation and being a frequency band where an attenuation amount of the differential transmission characteristic, relative to the differential transmission characteristic in wired connection, is suppressible through gain adjustment performed upon transmission and reception of the digital baseband signal.

2. The contactless communication system of claim 1, wherein
the predetermined frequency band is a frequency band where the attenuation amount is no greater than approximately −10 dB when the differential transmission characteristic is plotted on a vertical axis against frequency on a horizontal axis.

3. The contactless communication system of claim 1, wherein
the first antenna and the second antenna are each configured by one or more antenna elements and each have an antenna length which is less than ½ of wavelength of a clock frequency of the digital baseband signal.

4. The contactless communication system of claim 3, wherein
the first antenna and the second antenna are disposed in opposing positions to one another.

5. The contactless communication system of claim 4, wherein
  the first antenna and the second antenna are each a dipole antenna configured by two antenna elements,
  the first antenna includes a first wire connecting the two antenna elements configuring the first antenna,
  the second antenna includes a second wire connecting the two antenna elements configuring the second antenna, and
  a first terminator is inserted into the first wire and a second terminator is inserted into the second wire.

6. The contactless communication system of claim 5, wherein
  the first wire and the second wire are each connected to each of the two antenna elements corresponding thereto, at a part of the antenna element furthest from an electrical supply point thereof.

7. The contactless communication system of claim 5, wherein
  the first device further includes a first differential pair consisting of two wires, each of the wires connecting the first communication unit to the electrical supply point of one of the two antenna elements configuring the first antenna, and
  the second device further includes:
    a second communication unit operable to receive the digital baseband signal; and
    a second differential pair consisting of two wires, each of the wires connecting the second communication unit to the electrical supply point of one of the two antenna elements configuring the second antenna.

8. The contactless communication system of claim 7, wherein
  the first device further includes a first loop antenna connected to the first communication unit and disposed surrounding the first antenna, and
  the second device further includes a second loop antenna connected to the second communication unit and disposed surrounding the second antenna.

9. The contactless communication system of claim 8, wherein
  a third terminator is inserted into the first loop antenna, and a fourth terminator is inserted into the second loop antenna.

10. The contactless communication system of claim 9, wherein
  the second communication unit is further operable to supply a digital baseband signal to the second antenna,
  the second antenna is further operable to transmit the digital baseband signal supplied from the second communication unit,
  the first antenna is further operable to receive the digital baseband signal transmitted from the second antenna, and
  the first communication unit is further operable to receive the digital baseband signal received by the first antenna.

11. The contactless communication system of claim 7, wherein
  the first device further includes a third antenna operable to transmit the digital baseband signal to the second antenna,
  the second antenna is disposed between the first antenna and the third antenna,
  an electrical supply point of an antenna element configuring the third antenna is connected to the first communication unit, and
  the first communication unit transmits the digital baseband signal to the second antenna using the first antenna and the third antenna.

12. The contactless communication system of claim 7, wherein
  the third antenna is a dipole antenna configured by two antenna elements, and
  the third antenna includes a third wire which connects the two antenna elements configuring the third antenna.

13. The contactless communication system of claim 12, wherein
  a third terminator is inserted into the third wire.

14. The contactless communication system of claim 11, wherein
  the first device further includes:
    a first loop antenna connected to the first communication unit and disposed surrounding the first antenna; and
    a third loop antenna connected to the first communication unit and disposed surrounding the third antenna, and
  the second device further includes a second loop antenna connected to the second communication unit and disposed surrounding the second antenna.

15. The contactless communication system of claim 14, wherein
  a third terminator is inserted into the first loop antenna,
  a fourth terminator is inserted into the second loop antenna, and
  a fifth terminator is inserted into the third loop antenna.

16. The contactless communication system of claim 11, wherein
  a wire connecting the first communication unit to the electrical supply point of the antenna element configuring the third antenna is equal in length to each of the two wires constituting the first differential pair.

17. The contactless communication system of claim 16, wherein
  the first communication unit is further operable to:
  judge which out of the first antenna and the third antenna has higher communication strength by comparing communication strength of communications with the second antenna for the first antenna and the third antenna; and
  transmit the baseband digital signal to the second antenna using whichever of the first antenna and the third antenna has higher communication strength.

18. The contactless communication system of claim 7, wherein
  the first communication unit further includes:
    an encoding processing unit operable to perform predetermined encoding processing on the digital baseband signal;
    a parallel-serial conversion unit operable to convert into serial data, the digital baseband signal after encoding by the encoding processing unit; and
    a first signal waveform adjustment processing unit operable to adjust a waveform of the digital baseband signal after conversion into the serial data by the parallel-serial conversion unit,
  the digital baseband signal after waveform adjustment by the first signal waveform adjustment processing unit is supplied to the first antenna,
  the second communication unit receives the digital baseband signal received by the second antenna, and
  the second communication unit includes:
    a second signal waveform adjustment processing unit operable to adjust a waveform of the digital baseband signal which is received, a serial-parallel conversion unit operable to convert into parallel data, the digital baseband signal after waveform adjustment by the second signal waveform adjustment processing unit; and a decoding processing unit operable to perform decoding processing corresponding to the predetermined encoding processing on the digital baseband signal after conversion into the parallel data by the serial-parallel conversion unit.

19. The contactless communication system of claim 18, wherein the predetermined encoding processing performed by the encoding processing unit is 8b10b encoding processing, and the decoding processing performed by the decoding processing unit is 8b10b decoding processing.

20. The contactless communication system of claim 18, wherein the first signal waveform adjustment processing unit adjusts signal waveform by performing one or more of pre-emphasis processing, de-emphasis processing and amplification processing, and the second signal waveform adjustment processing unit adjusts signal waveform by performing one or more of equalizing processing and amplification processing.

21. The contactless communication system of claim 18, wherein the predetermined encoding processing performed by the encoding processing unit is 8b10b encoding processing, the decoding processing performed by the decoding processing unit is 8b10b decoding processing, the first signal waveform adjustment processing unit adjusts signal waveform by performing one or more of pre-emphasis processing, de-emphasis processing and amplification processing, and the second signal waveform adjustment processing unit adjusts signal waveform by performing one or more of equalizing processing and amplification processing.

22. The contactless communication system of claim 1, wherein the digital baseband signal is a signal in which data has been superimposed on a clock through encoding.

23. The contactless communication system of claim 1, wherein the predetermined frequency band is less than the resonant frequency of the first antenna.

24. A dipole antenna, comprising:

two antenna elements which are fan-shaped; and a wire which has a terminator inserted therein and which connects one end of an arc-shaped edge of one of the antenna elements to one end of an arc-shaped edge of the other of the antenna elements, wherein for each of the antenna elements, the other end of the arc-shaped edge is an electrical supply point of the antenna element, and the dipole antenna transmits or receives a digital baseband signal by using a predetermined frequency band not including a resonant frequency of an antenna configured by the two antenna elements, the predetermined frequency band being selected from among a plurality of frequency bands where a differential transmission characteristic of the antenna exhibits a relatively small variation and being a frequency band where an attenuation amount of the differential transmission characteristic, relative to the differential transmission characteristic in wired connection, is suppressible through gain adjustment performed upon transmission and reception of the digital baseband signal.

25. The dipole antenna of claim 24, wherein an antenna length of each of the antenna elements is less than ¼ of wavelength of a clock frequency of the digital baseband signal which is transmitted or received.

* * * * *